(12) United States Patent
Yuan et al.

(10) Patent No.: US 12,493,058 B2
(45) Date of Patent: Dec. 9, 2025

(54) MAGNETIC SENSOR, CURRENT DETECTION APPARATUS AND CURRENT DETECTION METHOD

(71) Applicant: SUZHOU NOVOSENSE MICROELECTRONICS CO., LTD., Jiangsu (CN)

(72) Inventors: Fute Yuan, Jiangsu (CN); Jia Zhao, Jiangsu (CN)

(73) Assignee: Suzhou Novosense Microelectronics Co., Ltd., Jiangsu (CN)

( * ) Notice: Subject to any disclaimer, the term of this patent is extended or adjusted under 35 U.S.C. 154(b) by 196 days.

(21) Appl. No.: 18/446,380

(22) Filed: Aug. 8, 2023

(65) Prior Publication Data

US 2024/0044945 A1 Feb. 8, 2024

(30) Foreign Application Priority Data

Aug. 8, 2022 (CN) .......................... 202210944918.6

(51) Int. Cl.
  *G01R 15/20* (2006.01)
(52) U.S. Cl.
  CPC .................................. *G01R 15/205* (2013.01)
(58) Field of Classification Search
  CPC .... G01R 15/205; G01R 33/091; G01R 33/02; G01R 19/0092
  See application file for complete search history.

(56) References Cited

U.S. PATENT DOCUMENTS

| | | | |
|---|---|---|---|
| 2015/0022196 A1* | 1/2015 | Hebiguchi | G01R 19/0092 324/244 |
| 2015/0338444 A1* | 11/2015 | Ivanov | G01R 15/207 324/117 R |
| 2017/0276514 A1 | 9/2017 | Schmitt et al. | |
| 2018/0067146 A1* | 3/2018 | Kawanami | G01R 15/205 |
| 2020/0041580 A1 | 2/2020 | Yuan et al. | |
| 2020/0256934 A1* | 8/2020 | Saruki | G01R 33/0017 |

FOREIGN PATENT DOCUMENTS

| | | |
|---|---|---|
| CN | 103645448 A | 3/2014 |
| CN | 107250813 A | 10/2017 |
| CN | 113917216 A | 1/2022 |
| CN | 113945873 A | 1/2022 |
| CN | 114264861 A | 4/2022 |
| WO | 2019/167598 A1 | 9/2019 |

OTHER PUBLICATIONS

Office Action dated Apr. 16, 2024 from corresponding Chinese Application No. 202210944918.6.
Office Action dated Jun. 15, 2024 from corresponding Chinese Application No. 202210944918.6.

\* cited by examiner

*Primary Examiner* — Dominic E Hawkins
(74) *Attorney, Agent, or Firm* — ArentFox Schiff LLP

(57) ABSTRACT

A magnetic sensor having at least two sensing portions which are different in a direction of a magnetic field component of a first signal magnetic field generated by a current flowing through a conductor. The at least two sensing portions are correspondingly electrically connected. The sensing portion includes a half-bridge configuration or a full-bridge configuration. The sensing portion causes a resistance change to the first signal magnetic field through the half-bridge configuration or the full-bridge configuration so that a sensing electrical signal is generated.

20 Claims, 16 Drawing Sheets

MAGNETIC SENSOR, CURRENT DETECTION APPARATUS AND CURRENT DETECTION METHOD

CROSS-REFERENCES TO RELATED APPLICATION(S)

This application claims the priority to Chinese Patent Application No. CN202210944918.6, filed on Aug. 8, 2022, the disclosure of which is incorporated herein by reference in its entirety.

TECHNICAL FIELD

The present disclosure relates to the technical field of detection and, in particular, to a magnetic sensor, a current detection apparatus and a current detection method.

BACKGROUND

Current measurement plays an important role in many application fields such as motor servo control, circuit protection, power control and temperature adjustment. A traditional contact current measurement method is as follows: a resistor is connected in parallel on a current-carrying wire; a sampling circuit is arranged at two ends of the resistor to obtain the voltage across the resistor, and then a current value is calculated and finally output through an isolation chip. However, the traditional contact current measurement has the problems of complex overall device framework and high cost.

When the existing magnetic sensor is used to detect the current, the magnetic sensor is affected by the interference of an environmental magnetic field, leading to the problem of low detection accuracy.

SUMMARY

The present disclosure provides a magnetic sensor, a current detection apparatus and a current detection method.

In an embodiment of the present disclosure, a magnetic sensor is provided.

The magnetic sensor includes at least two sensing portions which are different in a direction of a magnetic field component of a first signal magnetic field generated by the current flowing through a conductor and are correspondingly electrically connected.

A sensing portion of the at least two sensing portions includes a half-bridge configuration or a full-bridge configuration and is configured to cause a resistance change to the first signal magnetic field through the half-bridge configuration or the full-bridge configuration to generate a sensing electrical signal.

In an embodiment, the first signal magnetic field has different directions in the at least two sensing portions.

The first signal magnetic field has different strengths in the at least two sensing portions.

In an embodiment, an orthographic projection of at least one of the at least two sensing portions on the conductor at least partially overlaps the conductor.

Alternatively, an orthographic projection of none of the at least two sensing portions on the conductor overlaps the conductor.

In an embodiment, the magnetic sensor further includes a plurality of first connection lines and a plurality of output terminals.

The at least two sensing portions are connected in parallel through the plurality of first connection lines, and each of the plurality of first connection lines is connected to one of the plurality of output terminals.

In an embodiment, the plurality of output terminals includes a first output terminal, a second output terminal, a first drive terminal and a second drive terminal.

The first output terminal is configured to output a first sensing electrical signal.

The second output terminal is configured to output a second sensing electrical signal.

The first drive terminal is configured to be connected to a power supply and the second drive terminal is configured to be grounded; or the first drive terminal is configured to be grounded and the second drive terminal is configured to be connected to a power supply.

Under the first signal magnetic field, the first sensing electrical signal and the second sensing electrical signal have different amplitude variations and phase variations.

In an embodiment, the half-bridge configuration includes a first electrode, a second electrode, a first magnetoresistive unit, a second magnetoresistive unit and a connection terminal; a first terminal of the first magnetoresistive unit is connected to the first electrode, a second terminal of the first magnetoresistive unit is connected to a first terminal of the second magnetoresistive unit and the connection terminal, and a second terminal of the second magnetoresistive unit is connected to the second electrode.

The full-bridge configuration includes a first electrode, a second electrode, a third electrode, a fourth electrode, a third magnetoresistive unit, a fourth magnetoresistive unit, a fifth magnetoresistive unit and a sixth magnetoresistive unit; and a first terminal of the third magnetoresistive unit is connected to the first electrode, a second terminal of the third magnetoresistive unit is connected to a first terminal of the fourth magnetoresistive unit and the second electrode, a second terminal of the fourth magnetoresistive unit is connected to the a first terminal of the fifth magnetoresistive unit and the third electrode, a second terminal of the fifth magnetoresistive unit is connected to a first terminal of the sixth magnetoresistive unit and the fourth electrode, and a second terminal of the sixth magnetoresistive unit is connected to the first electrode.

In an embodiment, the at least two sensing portions include a first sensing portion and a second sensing portion.

The first sensing portion and the second sensing portion each have a half-bridge configuration.

A first electrode of the half-bridge configuration of the first sensing portion and a first electrode of the half-bridge configuration of the second sensing portion are connected as the first drive terminal; a second electrode of the half-bridge configuration of the first sensing portion and a second electrode of the half-bridge configuration of the second sensing portion are connected as the second drive terminal; a connection terminal of the half-bridge configuration of the first sensing portion is configured as the first output terminal; and a connection terminal of the half-bridge configuration of the second sensing portion is configured as the second output terminal.

In an embodiment, the at least two sensing portions include a first sensing portion and a second sensing portion.

The first sensing portion and the second sensing portion each have a full-bridge configuration.

A first electrode of the full-bridge configuration of the first sensing portion and a first electrode of the full-bridge configuration of the second sensing portion are connected as the first drive terminal; a second electrode of the full-bridge configuration of the first sensing portion and a fourth electrode of the full-bridge configuration of the second sensing portion are connected as the second output terminal; a third electrode of the full-bridge configuration of the first sensing portion and a third electrode of the full-bridge configuration of the second sensing portion are connected as the second drive terminal; and a fourth electrode of the full-bridge configuration of the first sensing portion and a second electrode of the full-bridge configuration of the second sensing portion are connected as the first output terminal.

In an embodiment, the at least two sensing portions include a first sensing portion, a second sensing portion, and a third sensing portion.

The first sensing portion has a full-bridge configuration, and the second sensing portion and the third sensing portion each have a half-bridge configuration.

A first electrode of the full-bridge configuration of the first sensing portion, a first electrode of the half-bridge configuration of the second sensing portion and a first electrode of the half-bridge configuration of the third sensing portion are connected as the first drive terminal.

A second electrode of the full-bridge configuration of the first sensing portion and a connection terminal of the half-bridge configuration of the third sensing portion are connected as the first output terminal.

A third electrode of the full-bridge configuration of the first sensing portion, a second electrode of the half-bridge configuration of the second sensing portion and a second electrode of the half-bridge configuration of the third sensing portion are connected as the second drive terminal.

A fourth electrode of the full-bridge configuration of the first sensing portion and a connection terminal of the half-bridge configuration of the second sensing portion are connected as the second output terminal.

In an embodiment, a sensitive direction of the magnetic sensor is parallel or perpendicular to a plane where the conductor is disposed.

In another embodiment, a current detection apparatus is provided. A conductor is arranged in a preset detection area corresponding to the current detection apparatus; and a first signal magnetic field is generated when a current passes through the conductor.

The current detection apparatus includes a substrate, at least one magnetic sensor provided in any preceding embodiment and arranged on the substrate, and a processing unit.

The magnetic sensor is configured to generate sensing electrical signals according to the first signal magnetic field generated when the current flows through the conductor.

The processing unit is connected to the magnetic sensor and is configured to determine a value of the current according to the sensing electrical signals.

In an embodiment, the substrate has a first surface facing the conductor and a second surface facing away from the conductor.

The substrate includes at least two sensing positions which are spaced apart on the first surface or the second surface.

The at least two sensing portions are arranged at the at least two sensing positions; the magnetic sensor is configured to sense the first signal magnetic field generated when the current passes through the conductor.

The magnetic sensor is configured to generate the sensing electrical signals according to a difference between magnetic field strengths of components of the first signal magnetic field in preset directions at the at least two sensing positions.

In an embodiment, the at least two sensing portions of each of the at least one magnetic sensor have a same configuration or different configurations.

In an embodiment, the current detection apparatus further includes at least one switching circuit arranged on the substrate.

A switching circuit of the at least one switching circuit is electrically connected to output terminals of the magnetic sensor, is configured to switch a connection mode of the output terminals of the at least one magnetic sensor so as to adjust a working state of the at least one magnetic sensor, and is configured to sequentially drive the at least one magnetic sensor to output sensing electrical signals under the first signal magnetic field.

In an embodiment, the at least one magnetic sensor is arranged in one-to-one correspondence with the at least one switching circuit.

In an embodiment, the current detection apparatus further includes an amplifying unit.

The amplifying unit is connected between the switching circuit and the processing unit and is configured to receive the sensing electrical signals, perform differential amplification on the sensing electrical signals, and output the amplified sensing electrical signals to the processing unit.

In another embodiment, a current detection method is provided and applied to the current detection apparatus provided in any preceding embodiment. The current detection apparatus includes a substrate and at least one magnetic sensor provided in any preceding embodiment and arranged on the substrate, where a conductor is arranged in a preset detection area corresponding to the current detection apparatus and a first signal magnetic field is generated when a current passes through the conductor.

The current detection method includes the steps described below.

The magnetic sensor generates sensing electrical signals according to the first signal magnetic field generated when the current flows through the conductor.

A processing unit is configured to determine, according to the sensing electrical signals, a value of the current.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

To illustrate technical solutions in embodiments of the present disclosure more clearly, the drawings used in description of the embodiments are described below.

Apparently, the drawings described below merely illustrate part of the embodiments of the present disclosure, and those of ordinary skill in the art may obtain other drawings based on the drawings described below.

DETAILED DESCRIPTION

For a better understanding of the solutions of the present disclosure by those skilled in the art, the technical solutions in embodiments of the present disclosure are described clearly and completely below in conjunction with the drawings in the embodiments of the present disclosure. Apparently, the embodiments described below are merely part, not all, of the embodiments of the present disclosure.

It is to be noted that the terms "first", "second" and the like in the description, claims and drawings of the present disclosure are used to distinguish between similar objects and are not necessarily used to describe a particular order or sequence. It is to be understood that the data used in this way is interchangeable where appropriate so that the embodiments of the present disclosure described herein may also be implemented in a sequence not illustrated or described herein. In addition, terms "including" and "having" or any variations thereof are intended to encompass a non-exclusive inclusion. For example, a process, method, system, product or apparatus that includes a series of steps or units not only includes the expressly listed steps or units but may also include other steps or units that are not expressly listed or are inherent to such a process, method, product or apparatus.

Figure 1:
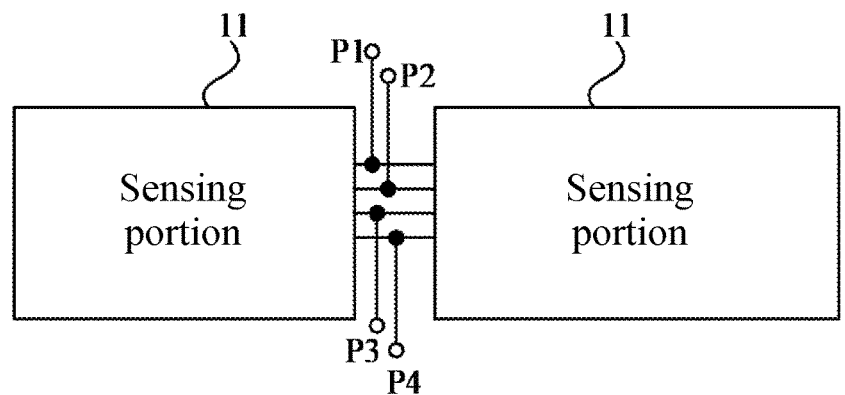
FIG. 1 is a structural diagram of a magnetic sensor according to an embodiment of the present disclosure.
Figure 2:
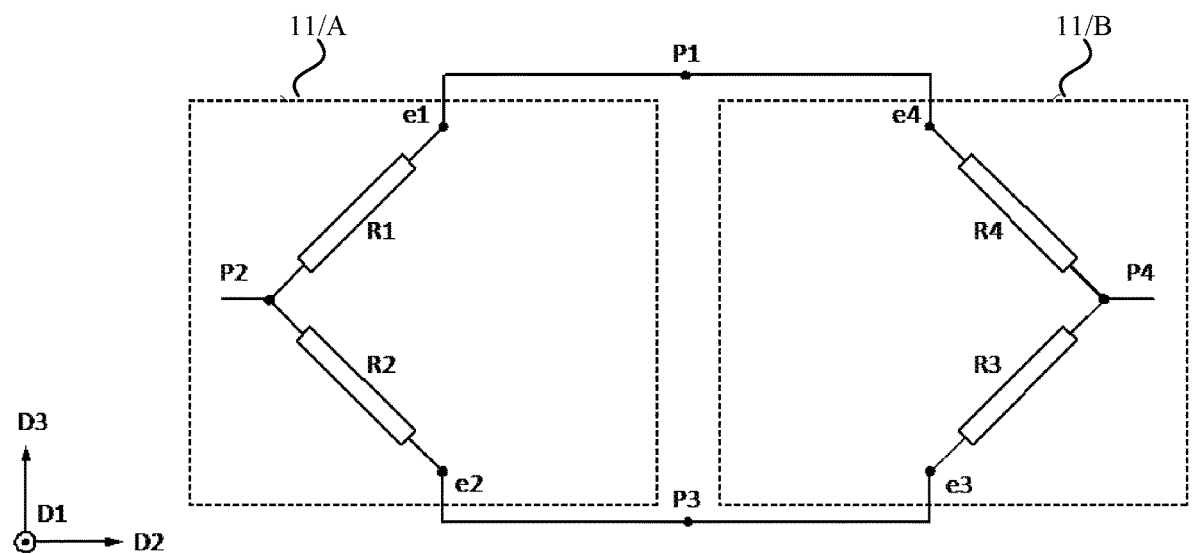
FIG. 2 is a structural view of a half-bridge configuration of a magnetic sensor according to an embodiment of the present disclosure.
Figure 3:
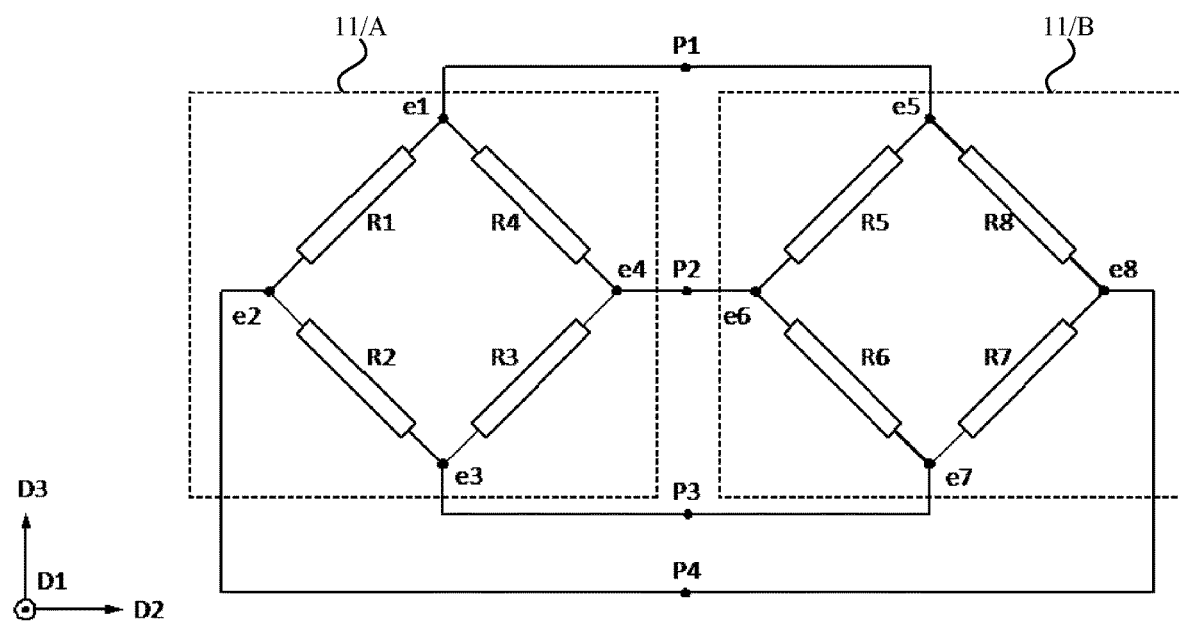
FIG. 3 is a structural view of a full-bridge configuration of a magnetic sensor according to an embodiment of the present disclosure.

FIG. 1 is a structural diagram of a magnetic sensor according to an embodiment of the present disclosure. FIG. 2 is a structural view of a half-bridge configuration of a magnetic sensor according to an embodiment of the present disclosure. FIG. 3 is a structural view of a full-bridge configuration of a magnetic sensor according to an embodiment of the present disclosure. With reference to FIG. 1 to FIG. 3, a magnetic sensor 10 provided in an embodiment of the present disclosure includes at least two sensing portions 11 which are different in a direction of a magnetic field component of a first signal magnetic field. The first signal magnetic field is generated by a current flowing through a conductor W. The at least two sensing portions 11 are correspondingly electrically connected. The sensing portion 11 includes a half-bridge configuration or a full-bridge configuration. The sensing portion 11 causes a resistance change to the first signal magnetic field through the half-bridge configuration or the full-bridge configuration so that a sensing electrical signal is generated. The sum of sensing electrical signals generated by the at least two sensing portions 11 of the magnetic sensor 10 for a second magnetic field is zero, and the second magnetic field includes a uniform magnetic field outside the conductor W.

In an embodiment, a current I flows in the conductor W. When the current I flows into the conductor W from the first terminal w1 of the conductor W, the current I flows out of the conductor W from the second terminal w2 of the conductor W. The first signal magnetic field is generated when the current I passes through the conductor W. The conductor W is arranged in the preset detection area corresponding to the magnetic sensor 10 provided in the embodiment of the present disclosure. Under the action of the first signal magnetic field, the magnetic sensor 10 may convert the sensed magnetic field component into an electrical signal for output. The current path formed by the conductor W may be U-shaped, linear-shaped, or S-shaped, which is not limited herein.

The at least two sensing portions 11 of the magnetic sensor 10 are different in a direction of a magnetic field component of the first signal magnetic field. Exemplarily, with reference to FIG. 2 which exemplarily shows a case where the magnetic sensor 10 includes two sensing portions 11, the two sensing portions 11 are different in the direction of the magnetic field component of the first signal magnetic field. The sensing portions 11 which are different in the direction of the magnetic field component of the first signal magnetic field generate different sensing electrical signals.

The at least two sensing portions 11 are correspondingly electrically connected so that the sensing electrical signals sensed by the at least two sensing portions 11 are summed and then output.

The sensing portion 11 includes a half-bridge configuration or a full-bridge configuration. FIG. 2 exemplarily shows a case where the two sensing portions 11 each include a half-bridge configuration and FIG. 3 exemplarily shows a case where the two sensing portions 11 each include a full-bridge configuration, which is not limited herein. The sensing portion 11 is provided with a half-bridge configuration or a full-bridge configuration such that the magnetic sensor 10 has no signal output for a second magnetic field including a uniform magnetic field outside the conductor W, for example, the second magnetic field may include an environmental magnetic field. With such arrangement, the magnetic sensor 10 outputs the sensing electrical signals merely for the first signal magnetic field and does not output a sensing electrical signal for the second magnetic field, thereby better eliminating the interference of the uniform magnetic field outside the conductor W.

Figure 4:
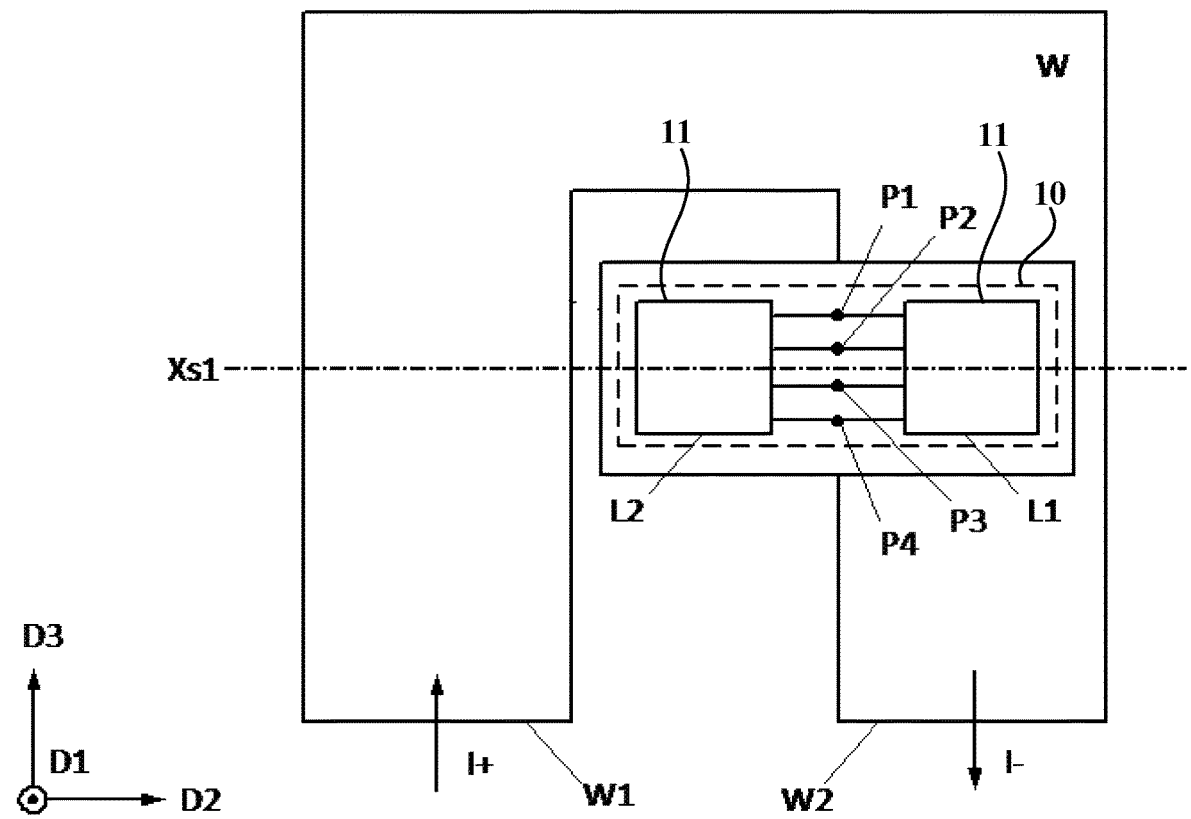
FIG. 4 is a structural view of a magnetic sensor detecting a current flowing through a conductor according to an embodiment of the present disclosure.
Figure 5:
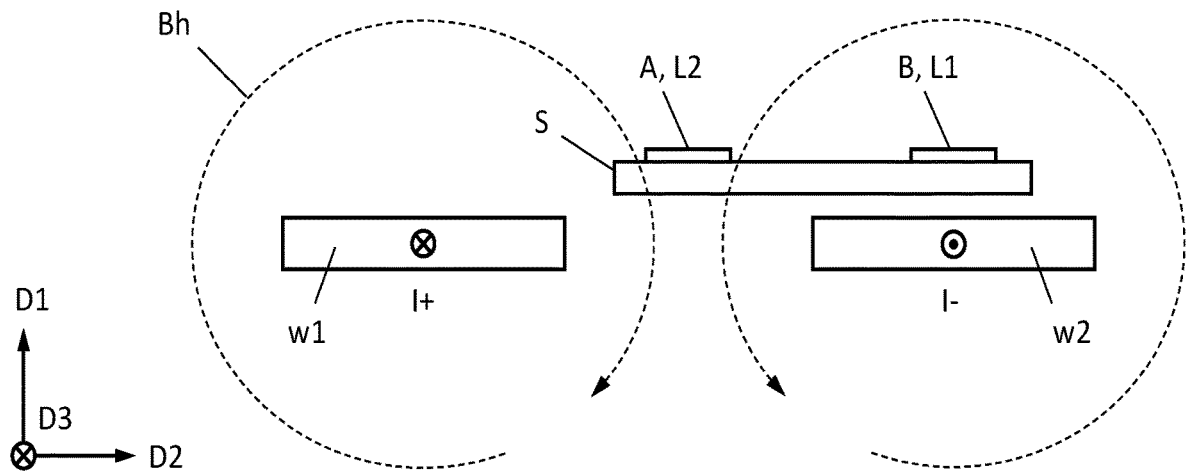
FIG. 5 is a sectional view of a magnetic sensor detecting a current flowing through a conductor according to an embodiment of the present disclosure.

The magnetic sensor 10 provided in the embodiment of the present disclosure includes at least two sensing portions 11 which are different in the direction of the magnetic field component of the first signal magnetic field. The sensing portion 11 includes the half-bridge configuration or the full-bridge configuration. The magnetic sensor 10 generates sensing electrical signals according to the first signal magnetic field generated when the current flows through the conductor W. The magnetic sensor 10 has no signal output for the second magnetic field, and the second magnetic field includes the uniform magnetic field outside the conductor W. With such arrangement, the magnetic sensor 10 outputs the sensing electrical signals merely for the first signal magnetic field and does not output a sensing electrical signal for the second magnetic field, thereby better eliminating the interference of the uniform magnetic field outside the conductor W and improving the detection accuracy of the current I flowing through the conductor W. So that the problem that the detection accuracy of the magnetic sensor is affected by the interference of the environmental magnetic field can be solved when the existing magnetic sensor detects the current FIG. 4 is a structural view of a magnetic sensor detecting a current flowing through a conductor W according to an embodiment of the present disclosure. FIG. 5 is a sectional view of a magnetic sensor detecting a current flowing through a conductor W according to an embodiment of the present disclosure. On the basis of the preceding embodiment and with reference to FIG. 4 and FIG. 5, the first signal magnetic field has different directions at the at least two sensing portions 11 and has different strengths at the at least two sensing portions 11.

Such arrangement facilitates the difference in the amplitude of the sensing electrical signals generated by the sensing portions 11 and the retention of the sensing electrical signals generated by the sensing portions 11 under the first signal magnetic field. Since the sensing portions 11 are the same in the direction and strength of the second magnetic field, the sensing electrical signals generated by the sensing portions 11 under the second magnetic field are the same in amplitude and opposite in phase, thereby achieving that the sum of the sensing electrical signals generated by the sensing portions 11 of the magnetic sensor 10 for the second magnetic field is zero.

FIG. 5 exemplarily shows the case where the sensing portions 11 include a first sensing portion A and a second sensing portion B. The magnetic sensor 10 is arranged at the second terminal w2 of the conductor W and has a preset distance from the conductor W. When a positive current I is introduced into the conductor W from the first terminal w1 and derived from the second terminal w2, a first signal magnetic field Bh is generated. The directions of the magnetic field components of the first signal magnetic field Bh are clockwise around the first terminal w1 and counterclockwise around the second terminal w2. With such a magnetic field distribution, a magnetic field component in the −D2 direction is generated at the second sensing portion B. That is, the second sensing portion B of the magnetic sensor 10 detects a first signal magnetic field in the −D2 direction. The current I generates a magnetic field component in the −D1 direction at the first sensing portion A. That is, the first sensing portion A of the magnetic sensor 10 detects a first signal magnetic field in the −D1 direction. The magnetic sensor 10 generates sensing electrical signals according to the first signal magnetic field generated by the current I flowing through the conductor W.

On the basis of the preceding embodiments and with continued reference to FIG. 4, an orthographic projection of at least one sensing portion 11 on the conductor W at least partially overlaps the conductor W or an orthographic projection of neither of the sensing portions 11 on the conductor W overlaps the conductor W.

With such arrangement, the sensing portions are different in the direction of the magnetic field component of the first signal magnetic field, so that the magnetic sensor 10 can output sensing electrical signals under the first signal magnetic field, and the detection of the current value of the current I introduced into the conductor W can be achieved.

On the basis of the preceding embodiments and with continued reference to FIG. 4, the magnetic sensor 10 may further include a plurality of first connection lines and a plurality of output terminals; the sensing portions 11 are connected in parallel through the first connection lines, and each first connection line is connected to one output terminal.

In an embodiment, with such arrangement, the sensing portions 11 are connected in parallel through the first connection lines, and each first connection line leads out one output terminal. The output terminals are configured to output the sensing electrical signals generated by the sensing portions 11.

On the basis of the preceding embodiments and with reference to FIG. 1, FIG. 4 and FIG. 5, the output terminals of the magnetic sensor 10 provided in the embodiment of the present disclosure include a first output terminal P2, a second output terminal P4, a first drive terminal P1 and a second drive terminal P3. The first output terminal P2 is configured to output a first sensing electrical signal. The second output terminal P4 is configured to output a second sensing electrical signal. The first drive terminal P1 is configured to be connected to a power supply and the second drive terminal P3 is configured to be grounded; or the first drive terminal P1 is configured to be grounded and the second drive terminal P3 is configured to be connected to a power supply. Under the first signal magnetic field, the first sensing electrical signal and the second sensing electrical signal have different amplitude variations and different phase variations. Under the second magnetic field, the first sensing electrical signal and the second sensing electrical signal have a same amplitude variation and a same phase variation.

In an embodiment, with such arrangement, under the first signal magnetic field, the first sensing electrical signal output from the first output terminal P2 and the second sensing electrical signal output from the second output terminal P4 may have different amplitude variations and phase variations so that the strengths of the sensing electrical signals output from the magnetic sensor 10 can be enhanced. Under the second magnetic field, the first sensing electrical signal output from the first output terminal P2 and the second sensing electrical signal output from the second output terminal P4 may have the same amplitude variation and the same phase variation so that the sensing electrical signals output from the magnetic sensor 10 under the second magnetic field do not include a signal of a uniform magnetic field. With such arrangement, the current detection accuracy of the current detection apparatus is further improved, and the anti-electromagnetic interference ability of the current detection apparatus is improved.

On the basis of the preceding embodiments and with continued reference to FIG. 2, the half-bridge configuration includes a first electrode, a second electrode, a first magnetoresistive unit, a second magnetoresistive unit and a connection terminal; a first terminal of the first magnetoresistive unit is connected to the first electrode, a second terminal of the first magnetoresistive unit is connected to a first terminal of the second magnetoresistive unit and the connection terminal, and a second terminal of the second magnetoresistive unit is connected to the second electrode.

In an embodiment the first magnetoresistive unit and the second magnetoresistive unit can convert a magnetic field strength signal into a sensing electrical signal under the first signal magnetic field.

In an embodiment, with reference to FIG. 2, the magnetic sensor 10 may include a first sensing portion A and a second sensing portion B. The first sensing portion 11 and the second sensing portion 11 each may have a half-bridge configuration. FIG. 2 exemplarily shows the case where a first electrode e1 of the half-bridge configuration of the first sensing portion 11 and a first electrode e4 of the half-bridge configuration of the second sensing portion 11 are connected as the first drive terminal P1; a second electrode e2 of the half-bridge configuration of the first sensing portion 11 and a second electrode e3 of the half-bridge configuration of the second sensing portion 11 are connected as the second drive terminal P3; a connection terminal of the half-bridge configuration of the first sensing portion 11 is configured as the first output terminal P2; and a connection terminal of the half-bridge configuration of the second sensing portion 11 is configured as the second output terminal P4.

On the basis of the preceding embodiments and with continued reference to FIG. 3, the full-bridge configuration includes a first electrode, a second electrode, a third electrode, a fourth electrode, a third magnetoresistive unit, a fourth magnetoresistive unit, a fifth magnetoresistive unit and a sixth magnetoresistive unit; and a first terminal of the third magnetoresistive unit is connected to the first electrode, a second terminal of the third magnetoresistive unit is connected to a first terminal of the fourth magnetoresistive unit and the second electrode, a second terminal of the fourth magnetoresistive unit is connected to the a first terminal of the fifth magnetoresistive unit and the third electrode, a second terminal of the fifth magnetoresistive unit is connected to a first terminal of the sixth magnetoresistive unit and the fourth electrode, and a second terminal of the sixth magnetoresistive unit is connected to the first electrode.

In an embodiment, the third magnetoresistive unit, the fourth magnetoresistive unit, the fifth magnetoresistive unit and the sixth magnetoresistive unit can convert a magnetic field strength signal into a sensing electrical signal under the first signal magnetic field.

In an embodiment, with reference to FIG. 3, the magnetic sensor 10 may include a first sensing portion 11 and a second sensing portion 11. The first sensing portion 11 and the second sensing portion 11 each may have a full-bridge configuration. FIG. 3 exemplarily shows the case where a first electrode of the full-bridge configuration of the first sensing portion 11 and a first electrode of the full-bridge configuration of the second sensing portion 11 are connected as the first drive terminal P1; a second electrode of the full-bridge configuration of the first sensing portion 11 and a fourth electrode of the full-bridge configuration of the second sensing portion 11 are connected as the second output terminal P4; a third electrode of the full-bridge configuration of the first sensing portion 11 and a third electrode of the full-bridge configuration of the second sensing portion 11 are connected as the second drive terminal P3; and a fourth electrode of the full-bridge configuration of the first sensing portion 11 and a second electrode of the full-bridge configuration of the second sensing portion 11 are connected as the first output terminal P2.

On the basis of the preceding embodiments and with continued reference to FIG. 4, a sensitive direction of the magnetic sensor 10 is parallel to the plane where the conductor W is disposed; or a sensitive direction of the magnetic sensor 10 is perpendicular to the plane where the conductor W is disposed.

On the basis of the preceding embodiments and with continued reference to FIG. 2, the magnetic sensor 10 includes the first sensing portion A and the second sensing portion B. The first sensing portion 11 and the second sensing portion 11 each have the half-bridge configuration. The first electrode e1 of the half-bridge configuration of the first sensing portion 11 and the first electrode e4 of the half-bridge configuration of the second sensing portion 11 are connected as the first drive terminal P1; the second electrode e2 of the half-bridge configuration of the first sensing portion 11 and the second electrode e3 of the half-bridge configuration of the second sensing portion 11 are connected as the second drive terminal P3; the connection terminal of the half-bridge configuration of the first sensing portion 11 is configured as the first output terminal P2; and the connection terminal of the half-bridge configuration of the second sensing portion 11 is configured as the second output terminal P4.

In an embodiment, at the first sensing portion A, the first magnetoresistive unit R1 is connected in series with the second magnetoresistive unit R2. At the second sensing portion B of the magnetic sensor 10, the first magnetoresistive unit R4 is connected in series with the second magnetoresistive unit R3. The first magnetoresistive unit R1 and second magnetoresistive unit R2 of the first sensing portion A cause different resistance changes to the magnetic field. The first magnetoresistive unit R1 of the first sensing portion A and the first magnetoresistive unit R4 of the second sensing portion B cause the same resistance change to the magnetic field. The second magnetoresistive unit R2 of the first sensing portion A and the second magnetoresistive unit R3 of the second sensing portion B cause the same resistance change to the magnetic field. In this case, the potential of the first output terminal P2 is consistent with the potential of the second output terminal P4 under the same first signal magnetic field.

Figure 6:
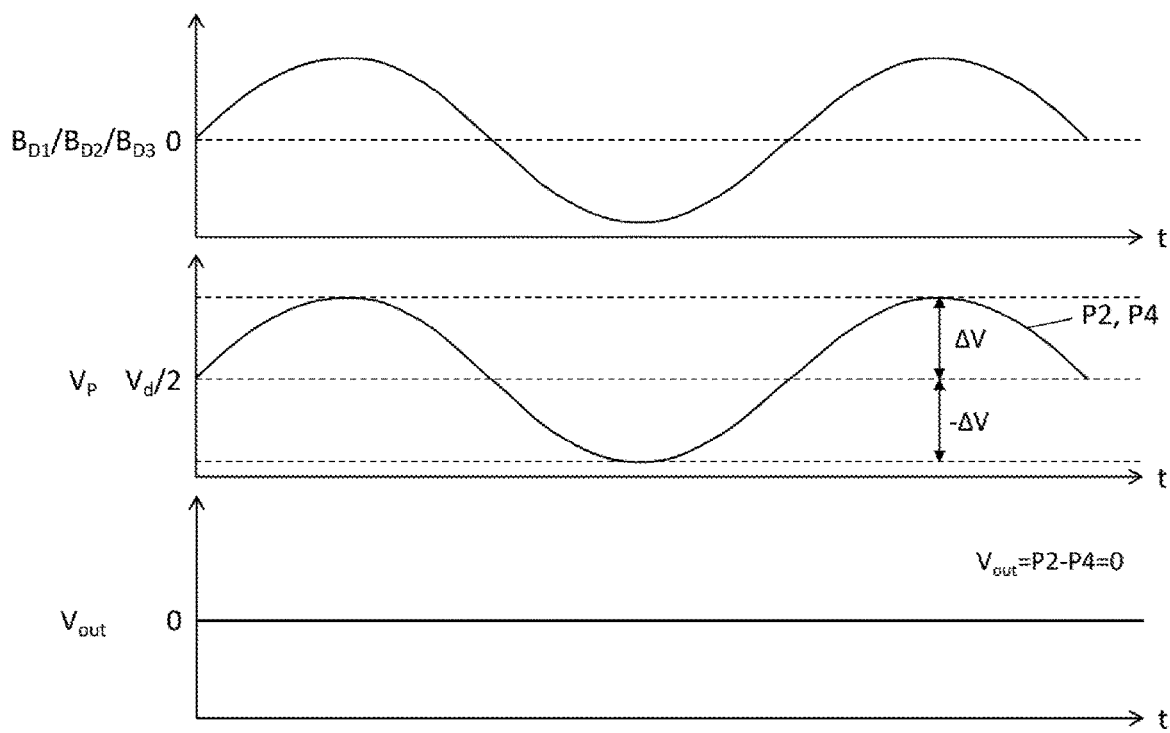
FIG. 6 is a waveform diagram of an output from a magnetic sensor for a second magnetic field according to an embodiment of the present disclosure.

FIG. 6 is a waveform diagram of an output from a magnetic sensor for a second magnetic field according to an embodiment of the present disclosure. With reference to FIG. 2, FIG. 5 and FIG. 6, FIG. 2 exemplarily shows that the responses of the first sensing portion A and the second sensing portion B in the magnetic sensor 10 to the magnetic field are configured to be completely identical. In the case where the uniform magnetic field generated by the external environment varies with time as shown in the first figure of FIG. 6, the first sensing portion A and the second sensing portion B sense an identical second magnetic field, and as shown in the second figure of FIG. 6, the potentials of the first output terminal P2 and the second output terminal P4 of the magnetic sensor 10 vary correspondingly with the sensing electrical signal of the second magnetic field and have a +/−ΔV fluctuation centered on half of the drive voltage ($V_d/2$). Since the potential variations at the contacts of the first output terminal P2 and the second output terminal P4 are completely identical, the overall output $V_{out}$ of the magnetic sensor 10 is equal to the sensing electrical signal at the first output terminal P2 minus the sensing electrical signal at the second output terminal P4, that is, 0.

Therefore, the magnetic sensor 10 as a whole has no signal output for the second magnetic field uniformly disturbed by the external environment, achieving the function of anti-external magnetic interference.

Figure 7:
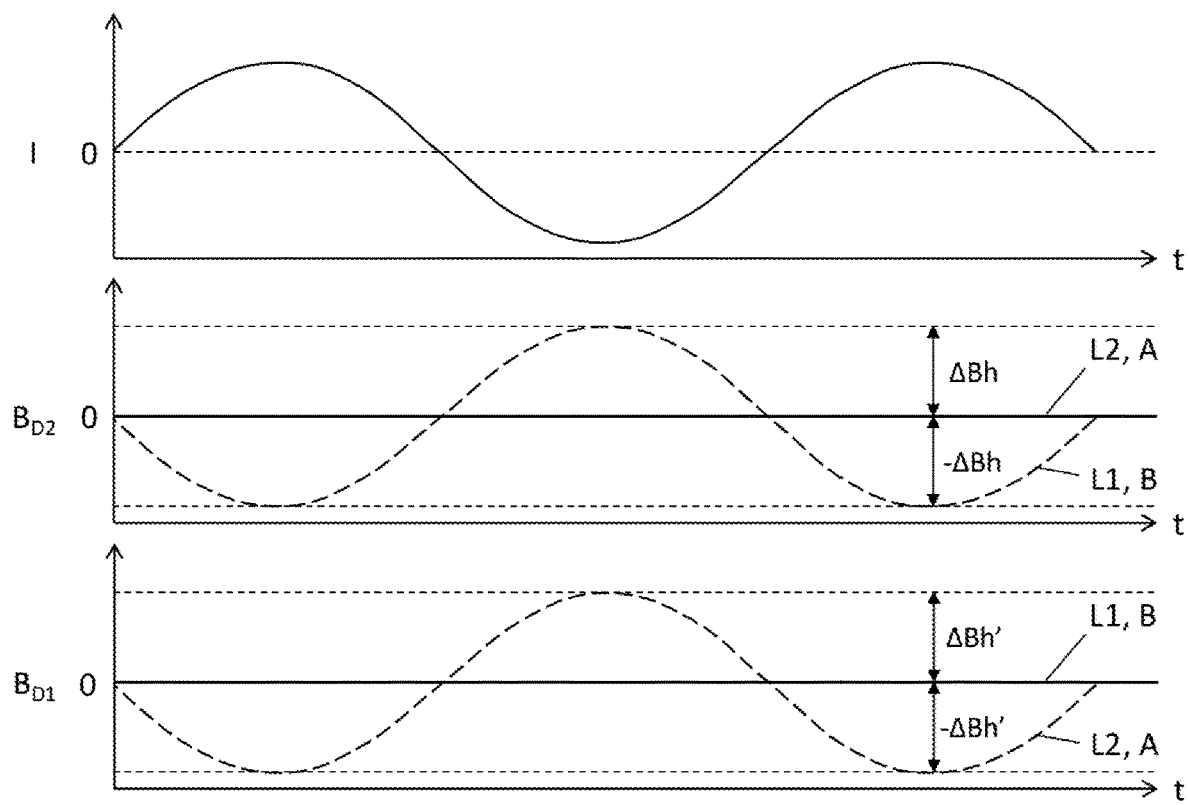
FIG. 7 is a waveform diagram of a first signal magnetic field where a magnetic sensor is located according to an embodiment of the present disclosure.
Figure 8:
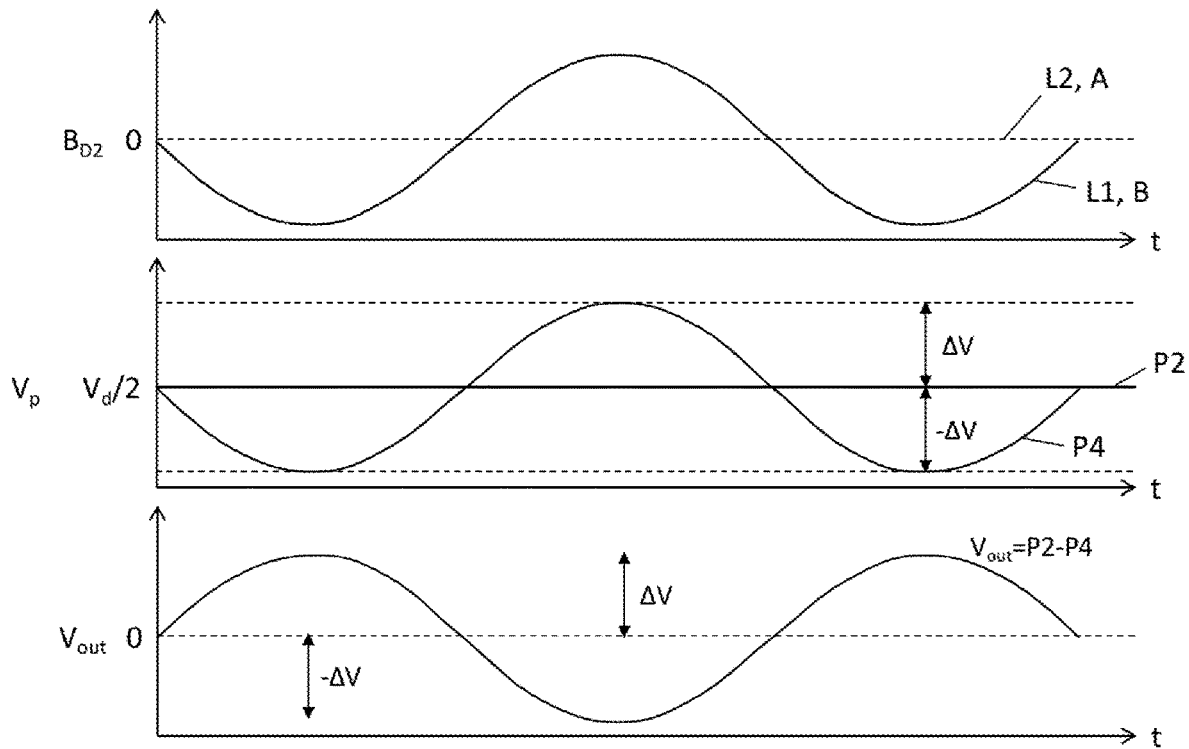
FIG. 8 is a waveform diagram of an output from a magnetic sensor for a first signal magnetic field according to an embodiment of the present disclosure.

FIG. 7 is a waveform diagram of a first signal magnetic field where a magnetic sensor is located according to an embodiment of the present disclosure. FIG. 8 is a waveform diagram of an output from a magnetic sensor for a first signal magnetic field according to an embodiment of the present disclosure. With reference to FIG. 2, FIG. 5, FIG. 7 and FIG. 8, FIG. 7 exemplarily shows variations in the first signal magnetic field component received by the first sensing portion A and the second sensing portion B of the magnetic sensor 10 when a current varies inside a conductor W. When the current at the first terminal w1 of the conductor W is positive, the horizontal component $B_{D2}$ of the generated first signal magnetic field is negative, that is, in the −D2 direction, at the second sensing portion B of the magnetic sensor 10, is zero at the first sensing portion A of the magnetic sensor 10, and varies with the current in the conductor W by +/−ΔBh. The vertical component $B_{D1}$ of the first signal magnetic field is zero at the second sensing portion B of the magnetic sensor 10, is negative, that is, in the −D1 direction, at the first sensing portion A of the magnetic sensor 10, and varies with the current in the conductor W by +/−ΔBh'. The sensing electrical signals generated by the horizontal magnetic field component $B_{D2}$ and vertical magnetic field component $B_{D1}$ of the first signal magnetic field generated by the current are consistent in phase.

In the case where the sensitive direction of the magnetic sensor 10 is parallel to the plane where the magnetic sensor 10 is disposed, in the configuration as shown in FIG. 4, the magnetic sensor 10 generates an output merely for the component of the first signal magnetic field in the D2 direction, and the relationship between the output characteristic and the component of the first signal magnetic field in the D2 direction is as shown in FIG. 8. In the case where the current passes through the conductor W and varies in magnitude with time, as shown in the first picture of FIG. 8, the component $B_{D2}$ of the first signal magnetic field in the D2 direction varies inversely with the current at the second sensing portion B of the magnetic sensor 10, that is, at the first sensing position L1 and is zero at the first sensing portion A of the magnetic sensor 10, that is, at the second sensing position L2. Therefore, the potential of the first output terminal P2 of the first sensing portion A of the magnetic sensor 10 does not vary with the current and is a constant value of $V_d/2$ for output. The potential of the second output terminal P4 of the second sensing portion B of the magnetic sensor 10 varies correspondingly with the component $B_{D2}$ of the first signal magnetic field in the D2 direction by a corresponding +/−ΔV fluctuation, as shown in the second picture of FIG. 8. The overall output $V_{out}$ of the magnetic sensor 10 in the first signal magnetic field is equal to the sensing electrical signal at the first output terminal P2 minus the sensing electrical signal at the second output terminal P4. The overall output $V_{out}$ of the magnetic sensor 10 in the first signal magnetic field is opposite in phase to and has the same amplitude as the sensing electrical signal at the second output terminal P4 in the output waveform.

Figure 9:
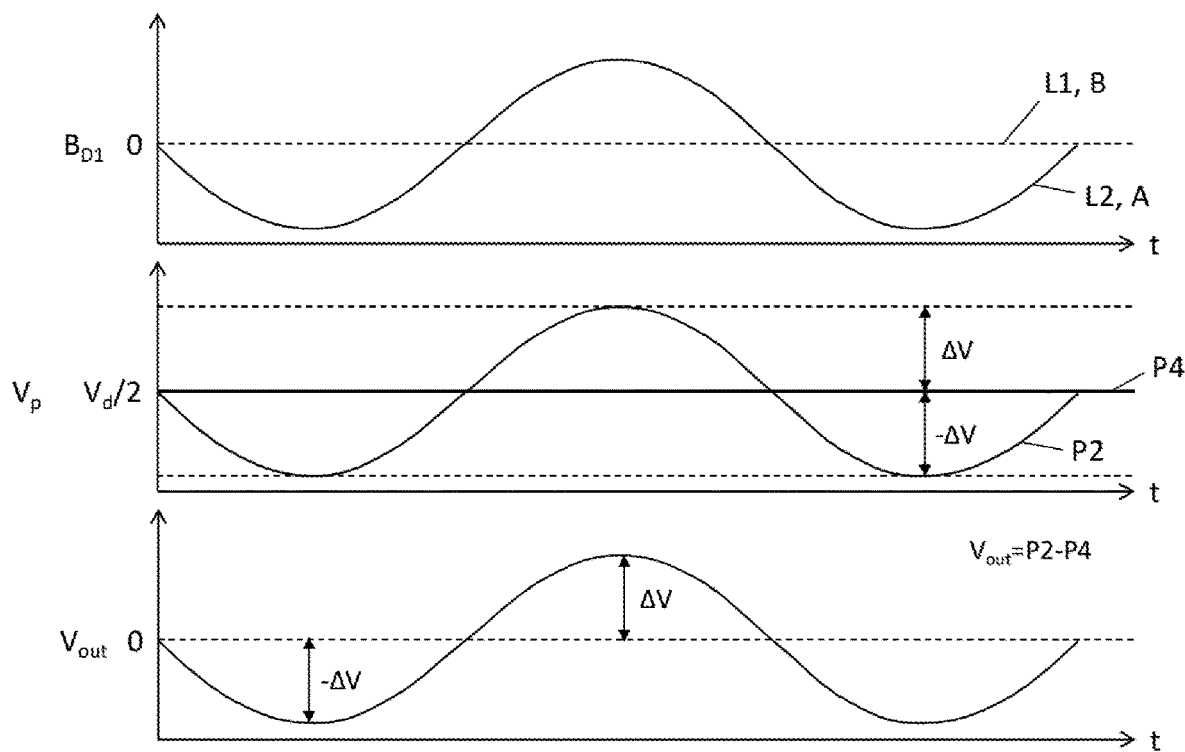
FIG. 9 is a waveform diagram of an output from another magnetic sensor for a first signal magnetic field according to an embodiment of the present disclosure.

FIG. 9 is a waveform diagram of an output from another magnetic sensor for a first signal magnetic field according to an embodiment of the present disclosure. With reference to FIG. 2, FIG. 5, FIG. 7 and FIG. 9, in the case where the sensitive direction of the magnetic sensor 10 is vertical to the plane where the magnetic sensor 10 is disposed, that is, in the D1 direction, in the configuration as shown in FIG. 4, the magnetic sensor 10 generates an output merely for the component of the first signal magnetic field in the D1 direction, and the relationship between the output characteristic and the component of the first signal magnetic field in the D1 direction is as shown in FIG. 9. When the current passes through the conductor W and varies in magnitude with time, as shown in the first picture of FIG. 7, the component $B_{D1}$ of the first signal magnetic field in the D1 direction is zero at the first sensing position L1 and varies in phase inversely with the current at the second sensing position L2. Therefore, the potential of the first output terminal P2 of the first sensing portion A of the magnetic sensor 10 varies by a corresponding +/−ΔV fluctuation with the magnetic field component $B_{D2}$ of the first signal magnetic field in the D2 direction. The potential of the second output terminal P4 of the second sensing portion B of the magnetic sensor 10 does not vary with the current and is a constant value of $V_d/2$ for output. The overall output $V_{out}$ of the magnetic sensor 10 is equal to the sensing electrical signal at the first output terminal P2 minus the sensing electrical signal at the second output terminal P4. The overall output $V_{out}$ of the magnetic sensor 10 is opposite in phase to and has the same amplitude as the sensing electrical signal at the second output terminal P4 in the output waveform.

Figure 10:
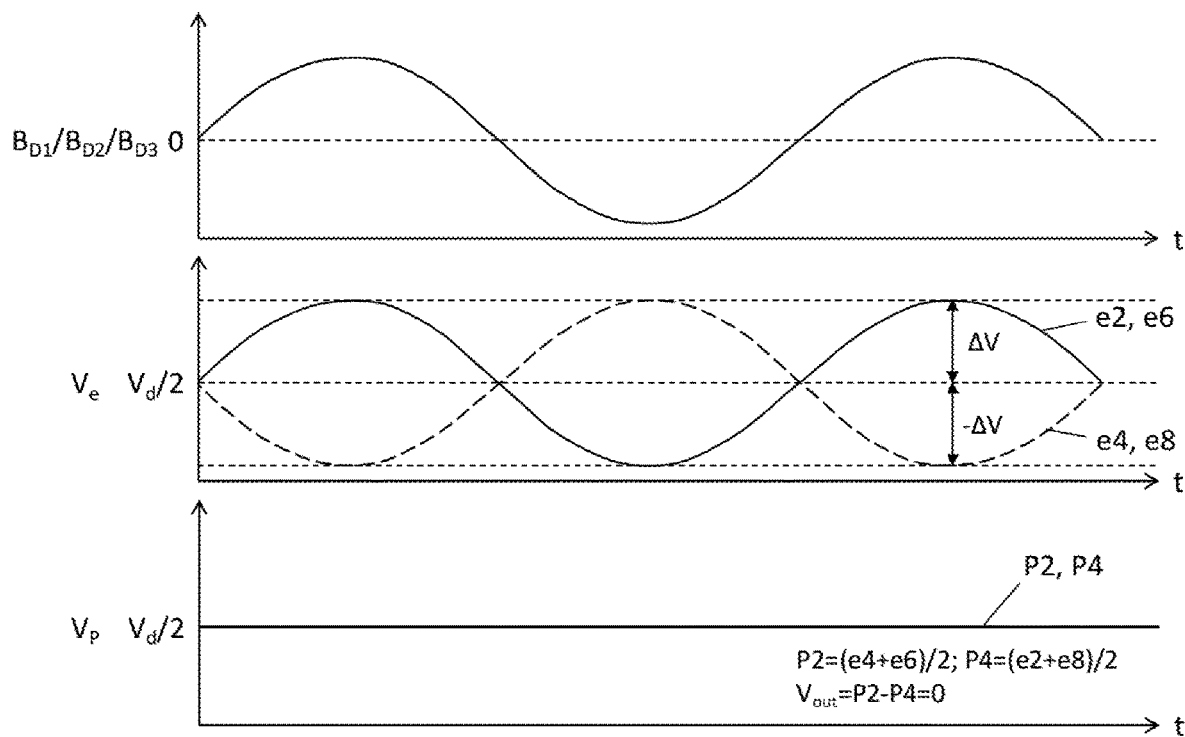
FIG. 10 is a waveform diagram of a second magnetic field where a magnetic sensor is located according to an embodiment of the present disclosure.
Figure 11:
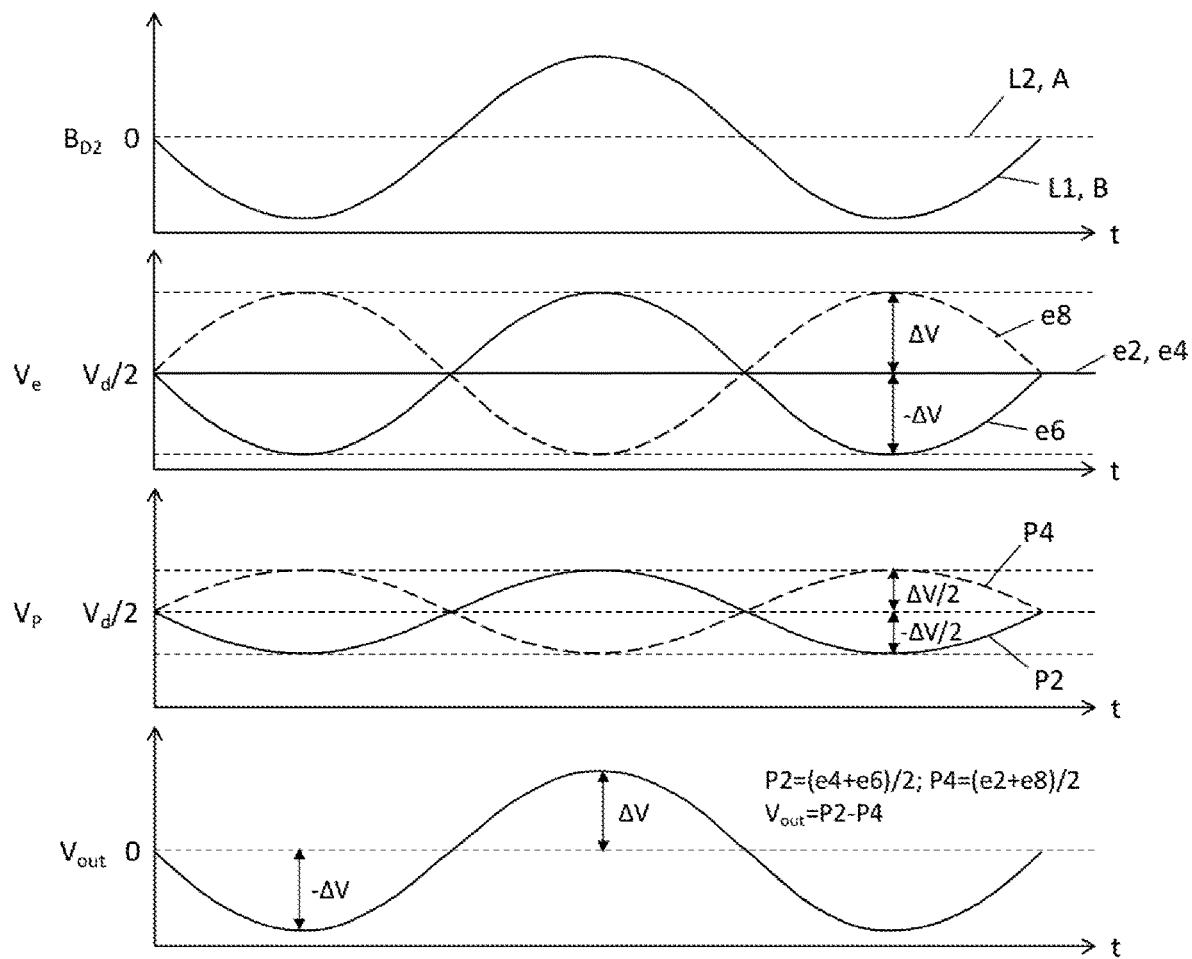
FIG. 11 is a waveform diagram of an output from another magnetic sensor for a first signal magnetic field according to an embodiment of the present disclosure.
Figure 12:
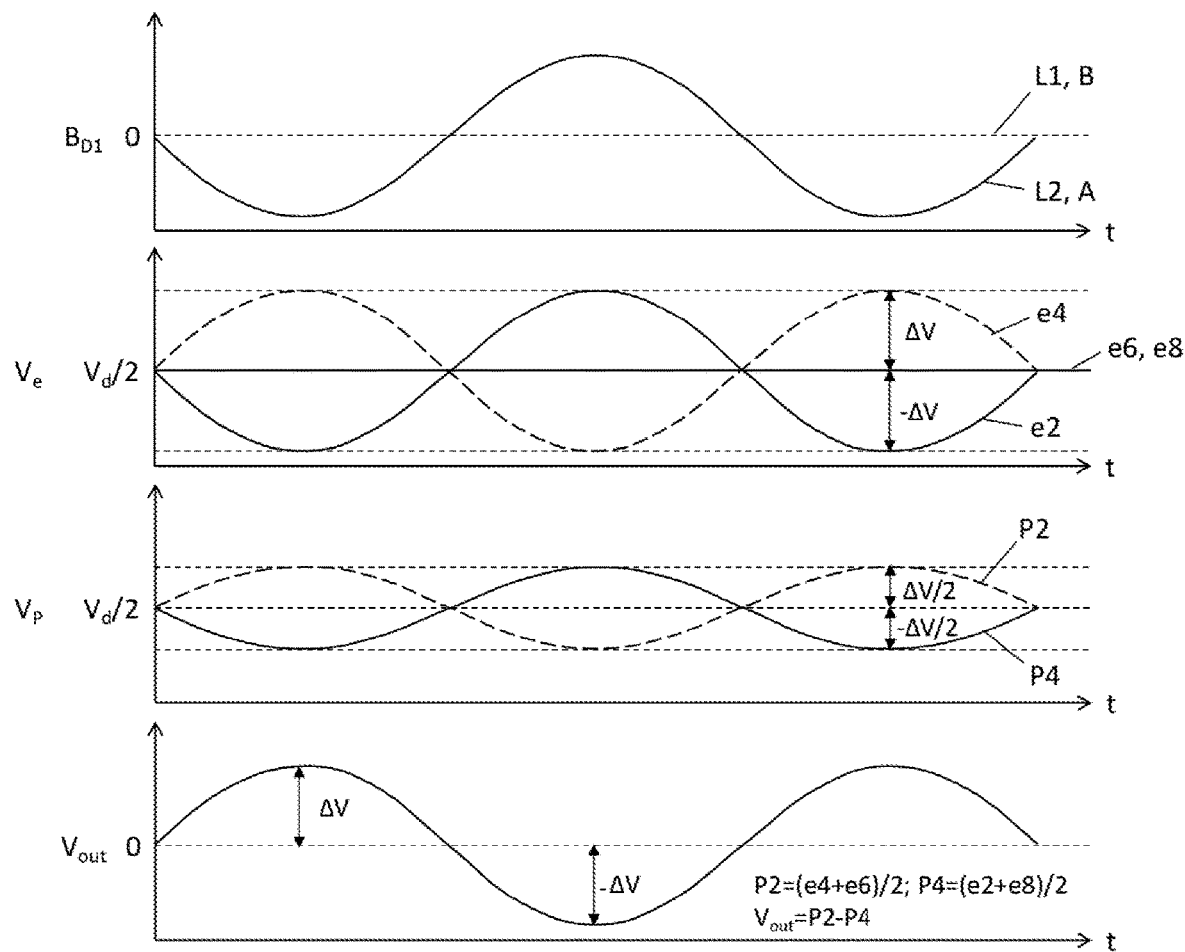
FIG. 12 is a waveform diagram of an output from another magnetic sensor for a first signal magnetic field according to an embodiment of the present disclosure.

FIG. 10 is a waveform diagram of a second magnetic field where a magnetic sensor is located according to an embodiment of the present disclosure. FIG. 11 is a waveform diagram of an output from another magnetic sensor for a first signal magnetic field according to an embodiment of the present disclosure. FIG. 12 is a waveform diagram of an output from another magnetic sensor for a first signal magnetic field according to an embodiment of the present disclosure. On the basis of the preceding embodiments and with continued reference to FIG. 3, the magnetic sensor 10 includes a first sensing portion 11 and a second sensing portion 11. The first sensing portion 11 and the second sensing portion 11 each have a full-bridge configuration. A first electrode of the full-bridge configuration of the first sensing portion 11 and a first electrode of the full-bridge configuration of the second sensing portion 11 are connected as the first drive terminal P1. A second electrode of the full-bridge configuration of the first sensing portion 11 and a fourth electrode of the full-bridge configuration of the second sensing portion 11 are connected as the second output terminal P4. A third electrode of the full-bridge configuration of the first sensing portion 11 and a third electrode of the full-bridge configuration of the second sensing portion 11 are connected as the second drive terminal P3. A fourth electrode of the full-bridge configuration of the first sensing portion 11 and a second electrode of the full-bridge configuration of the second sensing portion 11 are connected as the first output terminal P2.

In an embodiment, the first drive terminal P1 and the second drive terminal P3 of the magnetic sensor 10 are connected to a power supply and the ground. The first output terminal P2 and the second output terminal P4 are configured for outputting sensing electrical signals. In an optional implementation, the first output terminal P2 and the second output terminal P4 are connected to a power supply and the ground, and the first drive terminal P1 and the second drive terminal P3 are configured for outputting sensing electrical signals. The first sensing portion 11 includes a third magnetoresistive unit R31, a fourth magnetoresistive unit R32, a fifth magnetoresistive unit R33, and a sixth magnetoresistive unit R34. The second sensing portion B includes a third magnetoresistive unit R35, a fourth magnetoresistive unit R36, a fifth magnetoresistive unit R37, and a sixth magnetoresistive unit R38. The resistance change caused by each magnetoresistive unit of the magnetic sensor 10 to the magnetic field is set as follows: the resistance changes caused by the third magnetoresistive unit R31 and the fifth magnetoresistive unit R33 of the first sensing portion 11 are consistent with the resistance changes caused by the third magnetoresistive unit R35 and the fifth magnetoresistive unit R37 of the second sensing portion 11; the resistance changes caused by the fourth magnetoresistive unit R32 and the sixth magnetoresistive unit R34 of the first sensing portion 11 are consistent with the resistance changes caused by the fourth magnetoresistive unit R36 and the sixth magnetoresistive unit R38 of the second sensing portion 11. The third magnetoresistive unit R31 and fifth magnetoresistive unit R33 of the first sensing portion 11 and the third magnetoresistive unit R35 and fifth magnetoresistive unit R37 of the second sensing portion 11 are different from the fourth magnetoresistive unit R32 and sixth magnetoresistive unit R34 of the first sensing portion 11 and the fourth magnetoresistive unit R36 and sixth magnetoresistive unit R38 of the second sensing portion 11. Therefore, under the same magnetic field, the difference between the output from the second electrode e2 and output from the fourth electrode e4 of the first sensing portion A of the magnetic sensor 10 is identical to the difference between the output from the second electrode e6 and output from the fourth electrode e8 of the second sensing portion B.

FIG. 3 exemplarily shows that the responses of the first sensing portion A and the second sensing portion B in the magnetic sensor 10 to the magnetic field are configured to be completely identical. In the case where a uniform magnetic field of the external environment varies with time as shown in the first picture of FIG. 6, the potential of the second electrode e2 of the first sensing portion A and the potential of the second electrode e6 of the second sensing portion B of the magnetic sensor 10 have the same variation in phase as the second magnetic field, and the potential of the fourth electrode e4 of the first sensing portion A and the fourth electrode e8 of the second sensing portion B of the magnetic sensor 10 vary inversely in phase with the magnetic field. As shown in the second picture of FIG. 6, the potentials of the fourth electrode e4 of the first sensing portion A and the fourth electrode e8 of the second sensing portion B of the magnetic sensor 10 vary by a +/−ΔV fluctuation centered on half of the drive voltage ($V_d/2$). The sensing electrical signal at the first output terminal P2 is equal to the sensing electrical signal at the second output terminal P4 which is equal to (e4+e6) which is equal to (e2+e8) which is equal to $V_d/2$. As shown in the third picture of FIG. 10, since the potentials of the first output terminal P2 and the second output terminal P4 are both the constant value of $V_d/2$, the overall output $V_{out}$ of the magnetic sensor 10 is equal to the potential of the first output terminal P2 minus the potential of the second output terminal P4, that is, 0. Therefore, the magnetic sensor 10 has no signal output for the second magnetic field, that is, the uniform magnetic field of the external environment, achieving the function of anti-external magnetic interference.

In the case where the sensitive direction of the magnetic sensor 10 is parallel to the plane where the conductor W is disposed, in the configuration as shown in FIG. 4, the magnetic sensor 10 generates an output merely for the component of the first signal magnetic field in the D2 direction, and the relationship between the output characteristic and the component of the first signal magnetic field in the D2 direction is as shown in FIG. 11. In the case where the current passes through the conductor W and varies in magnitude with time as shown in the first picture of FIG. 11, the component $B_{D2}$ of the signal magnetic field in the D2 direction is zero at the second sensing portion L2 and varies in phase inversely with the current at the first sensing portion L1, as shown in the first picture of FIG. 11. Therefore, the potentials of the second electrode e2 and fourth electrode e4 of the first sensing portion A of the magnetic sensor 10 do not vary with the current and are a constant value of $V_d/2$, as shown in the second picture of FIG. 11. The potential of the second electrode e6 of the second sensing portion B of the magnetic sensor 10 has the same variation in phase as the component $B_{D2}$ of the first signal magnetic field in the D2 direction and has a variation in amplitude of +/−ΔV, as shown in the second picture of FIG. 11. The potential of the fourth electrode e8 of the second sensing portion B of the magnetic sensor 10 varies in phase inversely with the component $B_{D2}$ of the first signal magnetic field in the D2 direction and also has a variation in amplitude of +/−ΔV, as shown in the second picture of FIG. 11. The output of the first output terminal P2 is (e4+e6)/2, has an amplitude of ΔV/2, and has a phase opposite to the phase of the component $B_{D2}$ of the first signal magnetic field in the D2 direction, as shown in the third picture of FIG. 11. The output of the second output terminal P4 is (e2+e8)/2, has an amplitude of ΔV/2, and has the same phase as the component $B_{D2}$ of the first signal magnetic field in the D2 direction, as shown in the third picture of FIG. 11. The overall output $V_{out}$ of the magnetic sensor 10 is equal to the potential of the first output terminal P2 minus the potential of the second output terminal P4, has a phase opposite to the phase of the component $B_{D2}$ of the first signal magnetic field in the D2 direction, and has an amplitude of ΔV in the output waveform, as shown in the third picture of FIG. 11.

In the case where the sensitive direction of the magnetic sensor 10 is vertical to the plane where the conductor W is disposed, in the configuration as shown in FIG. 4, the magnetic sensor 10 generates an output merely for the component of the first signal magnetic field in the D1 direction, and the relationship between the output characteristic and the component of the first signal magnetic field in the D1 direction is as shown in FIG. 12. In the case where the current passes through the conductor W and varies in magnitude with time as shown in the first picture of FIG. 7, the component $B_{D1}$ of the signal magnetic field in the D1 direction varies in phase inversely with the current at the second sensing portion L2 and is zero at the first sensing portion L1, as shown in the first picture of FIG. 12. Therefore, the potential of the second electrode e2 of the first sensing portion A of the magnetic sensor 10 has the same variation in phase as the component $B_{D1}$ of the first signal magnetic field in the D1 direction and has a variation in amplitude of +−ΔV, as shown by the curved solid line in the second picture of FIG. 12. The fourth electrode e4 of the first sensing portion A varies in phase inversely with the component D1 of the first signal magnetic field in the D1 direction and has a variation in amplitude of +/−ΔV, as shown by the dotted line in the second picture of FIG. 12. The potentials of the second electrode e6 and fourth electrode e8 of the second sensing portion B of the magnetic sensor 10 do not vary with the current and are a constant value of $V_d/2$, as shown by the straight solid line in the second picture of FIG. 12. The output of the first output terminal P2 is (e4+e6)/2, has an amplitude of ΔV/2, and has a phase opposite to the phase of the component $B_{D1}$ of the first signal magnetic field in the D1 direction, as shown by the dotted line in the third picture of FIG. 12. The output of the second output terminal P4 is (e2+e8)/2, has an amplitude of ΔV/2, and has the same phase as the component $B_{D1}$ of the first signal magnetic field in the D1 direction, as shown by the solid line in the third picture of FIG. 12. The overall output $V_{out}$ of the magnetic sensor 10 is equal to the potential of the first output terminal P2 minus the potential of the second output terminal P4, has a phase opposite to the phase of the component $B_{D1}$ of the first signal magnetic field in the D1 direction, and has an amplitude of ΔV in the output waveform, as shown in the fourth picture of FIG. 12.

Figure 13:
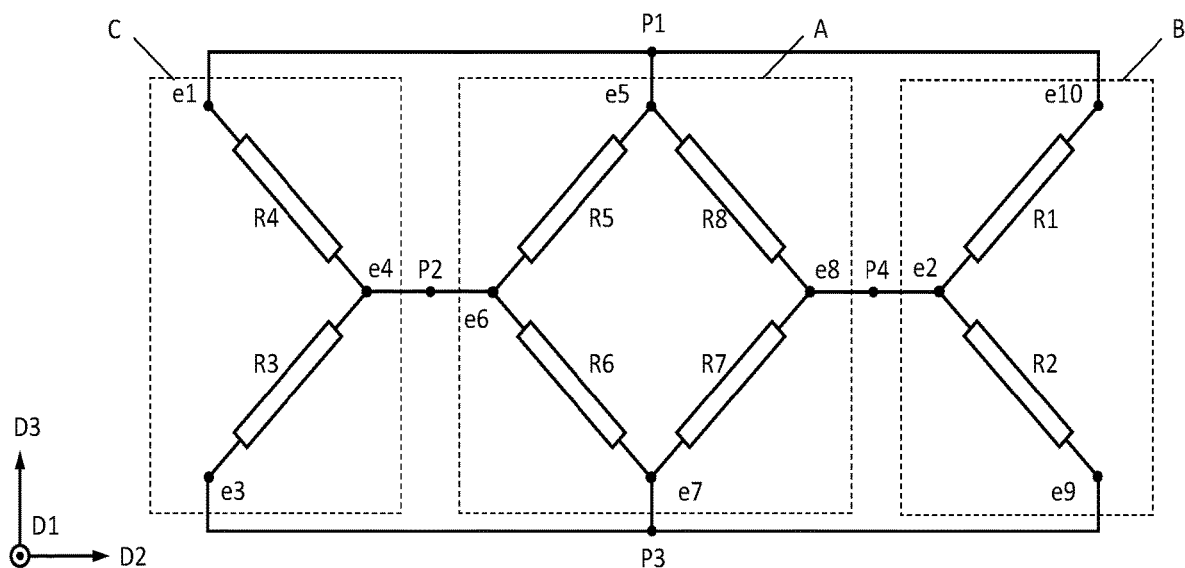
FIG. 13 is a structural view of a magnetic sensor according to an embodiment of the present disclosure.
Figure 14:
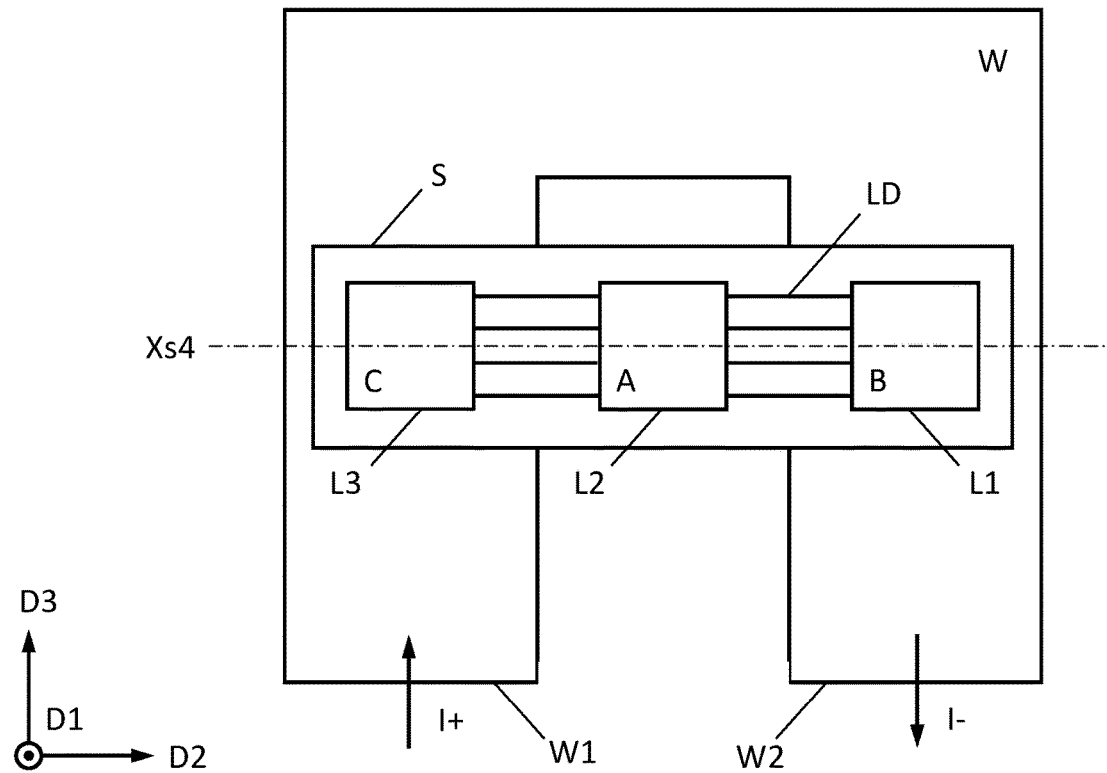
FIG. 14 is a structural view of a position relationship between another magnetic sensor and wires according to an embodiment of the present disclosure.
Figure 15:
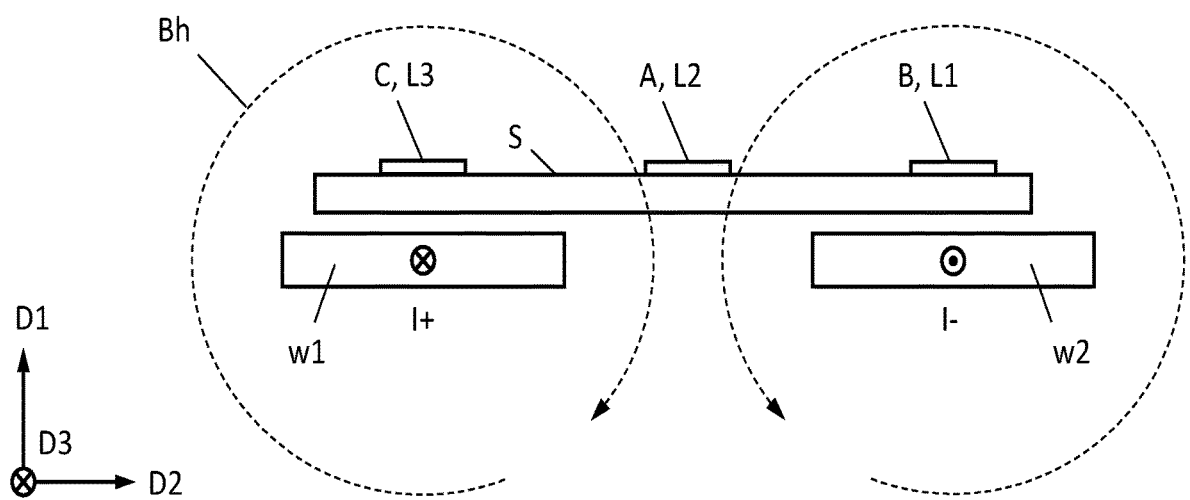
FIG. 15 is a sectional view of a magnetic sensor of FIG. 14 taken along Xs4 according to an embodiment of the present disclosure.

FIG. 13 is a structural view of a magnetic sensor according to an embodiment of the present disclosure. FIG. 14 is a structural view of a position relationship between another magnetic sensor and wires according to an embodiment of the present disclosure. FIG. 15 is a sectional view of a magnetic sensor of FIG. 14 taken along Xs4 according to an embodiment of the present disclosure. On the basis of the preceding embodiments and with reference to FIG. 13 to FIG. 15, the magnetic sensor 10 provided in the embodiment includes a first sensing portion A, a second sensing portion B and a third sensing portion C. The first sensing portion 11 has a full-bridge configuration; the second sensing portion 11 and the third sensing portion 11 each have a half-bridge configuration. A first electrode e5 of the full-bridge configuration of the first sensing portion 11, a first electrode e10 of the half-bridge configuration of the second sensing portion 11 and a first electrode e1 of the half-bridge configuration of the third sensing portion 11 are connected as the first drive terminal P1. A second electrode e6 of the full-bridge configuration of the first sensing portion 11 and a connection terminal e4 of the half-bridge configuration of the third sensing portion 11 are connected as the first output terminal P2. A third electrode e7 of the full-bridge configuration of the first sensing portion 11, a second electrode e9 of the half-bridge configuration of the second sensing portion 11 and a second electrode e3 of the half-bridge configuration of the third sensing portion 11 are connected as the second drive terminal P3. A fourth electrode e8 of the full-bridge configuration of the first sensing portion 11 and a connection terminal e2 of the half-bridge configuration of the second sensing portion 11 are connected as the second output terminal P4.

In an embodiment, FIG. 14 exemplarily shows the case where the conductor W is U-shaped. The conductor W includes a first terminal w1 and a second terminal w2. A current may be introduced from the first terminal w1, pass through the U-shaped path of the conductor W and then derived from the second terminal w2, and vice versa. The current direction parallel to the D3 direction may be defined as positive and the current direction parallel to and opposite to the D3 direction may be defined as negative. The first sensing portion A of the magnetic sensor 10 is arranged at a second sensing position L2 on the inner side of a turn of the conductor W. The projection of the first sensing portion A of the magnetic sensor 10 does not overlap or partially overlaps the projection of the conductor W. The distances from the second sensing position L2 to boundaries of the adjacent wires are equal. The second sensing portion B of the magnetic sensor 10 is arranged at the second terminal w2 of the conductor W. An orthographic projection of the second sensing portion B of the magnetic sensor 10 on the conductor W overlaps the conductor W. The distances from the first sensing position L1 to the adjacent boundaries of the second terminal w2 of the conductor W are equal. The third sensing portion C of the magnetic sensor 10 is arranged at the first terminal w1 of the conductor W. An orthographic projection of the third sensing portion C of the magnetic sensor 10 on the conductor W overlaps or partially overlaps the conductor W. The distances from the third sensing position L3 to the adjacent boundaries of the first terminal w1 of the conductor W are equal.

With reference to FIG. 15, when a positive current I+ is introduced into the conductor W from the first terminal w1 and derived from the second terminal w2, a first signal magnetic field Bh is generated. The direction of the first signal magnetic field Bh is clockwise around the first terminal w1 and counterclockwise around the second terminal w2. A magnetic field component of the first signal magnetic field in a −D2 direction is generated at the first sensing position L1. A magnetic field component in a −D1 direction is generated at the second sensing position L2 by the current. A magnetic field component in the −D2 direction is generated at the third sensing position L3. The first sensing portion A of the magnetic sensor 10 has merely a magnetic field component in the D1 direction, the second sensing portion B has a magnetic field component in the D2 direction, and the third sensing portion C has a magnetic field component in the D2 direction. Therefore, in such configuration, a better detection effect can be obtained by using the magnetic sensor 10 whose sensing direction is parallel to the D2 direction or parallel to the D1 direction.

With reference to FIG. 13, the third magnetoresistive unit R5, the fourth magnetoresistive unit R6, the fifth magnetoresistive unit R7 and the sixth magnetoresistive unit R8 of the first sensing portion A of the magnetic sensor 10 form a full-bridge configuration. The connection of the third magnetoresistive unit R5 and the sixth magnetoresistive unit R8 is the first electrode e5 of the first sensing portion 11, the connection of the third magnetoresistive unit R5 and the fourth magnetoresistive unit R6 is the second electrode of the first sensing portion A, the connection of the fourth magnetoresistive unit R6 and the fifth magnetoresistive unit R7 is the third electrode e7 of the first sensing portion 11, and the connection of the fifth magnetoresistive unit R7 and the sixth magnetoresistive unit R8 is the fourth electrode e8 of the first sensing portion 11.

The second sensing portion B of the magnetic sensor 10 is formed by the first magnetoresistive unit R1 and the second magnetoresistive unit R2, forming a half-bridge configuration. The connection between the first magnetoresistive unit R1 and the second magnetoresistive unit R2 of the second sensing portion B is the connection terminal e2. The other terminal of the first magnetoresistive unit R1 of the second sensing portion B is connected to the first electrode e10, and the other terminal of the second magnetoresistive unit R2 of the second sensing portion B is connected to the second electrode e9.

The first magnetoresistive unit R4 and the second magnetoresistive unit R3 of the third sensing portion C of the magnetic sensor 10 form a half-bridge configuration. The connection between the second magnetoresistive unit R3 and the first magnetoresistive unit R4 of the third sensing portion C is the connection terminal e4. The other terminal of the second magnetoresistive unit R3 is connected to the second electrode e3, and the other terminal of the first magnetoresistive unit R4 is connected to the first electrode e1. The first electrode e1 of the third sensing portion 11, the first electrode e5 of the first sensing portion 11 and the first electrode e10 of the second sensing portion 11 are connected to the first drive terminal P1. The second electrode e3 of the third sensing portion 11, the third electrode e7 of the second sensing portion 11 and the second electrode e9 of the second sensing portion 11 are connected to the second drive terminal P3. The connection terminal e4 of the third sensing portion 11 and the second electrode e6 of the first sensing portion 11 are connected to the first output terminal P2. The connection terminal e2 of the second sensing portion 11 and the fourth electrode e8 of the first sensing portion 11 are connected to the second output terminal P4. The magnetic sensor 10 may be driven by the first drive terminal P1 and the second drive terminal P3 being connected to a power supply and the ground. The first output terminal P2 and the second output terminal P4 are configured to output sensing electrical signals which may be voltage signals for example. The resistance change caused by each magnetoresistive unit of the magnetic sensor 10 to the magnetic field is set as follows: the resistance changes caused by the first magnetoresistive unit R1 of the second sensing portion 11, the second magnetoresistive unit R3 of the third sensing portion 11 and the third magnetoresistive unit R5 and fifth magnetoresistive unit R7 of the first sensing portion 11 are consistent; the resistance changes caused by the second magnetoresistive unit R2 of the second sensing portion 11, the first magnetoresistive unit R4 of the third sensing portion 11 and the fourth magnetoresistive unit R6 and sixth magnetoresistive unit R8 of the first sensing portion 11 are consistent; the resistance changes caused by the first magnetoresistive unit R1 of the second sensing portion 11 and the second magnetoresistive unit R2 of the second sensing portion 11 are different. Therefore, under the same second magnetic field, the magnetic sensor 10 has no signal output.

Figure 16:
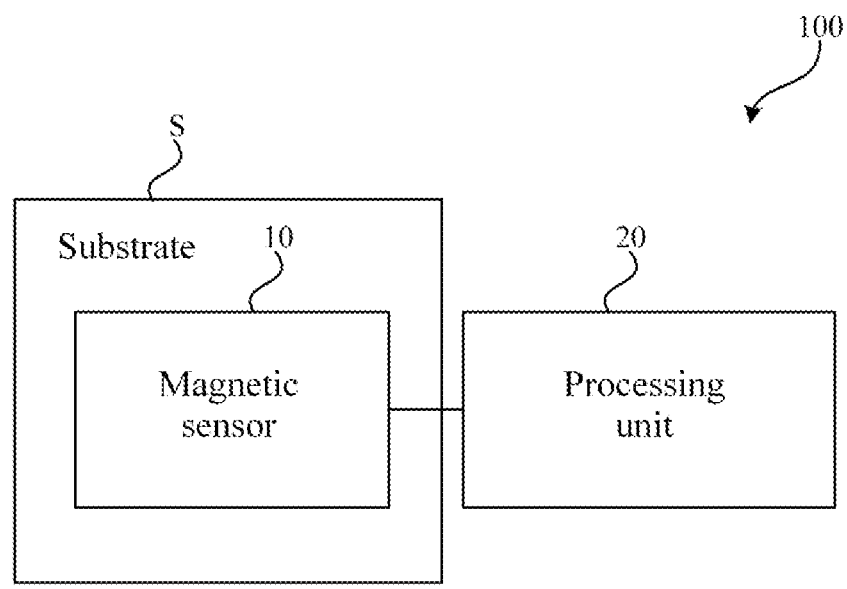
FIG. 16 is a structural diagram of a current detection apparatus according to an embodiment of the present disclosure.
Figure 17:
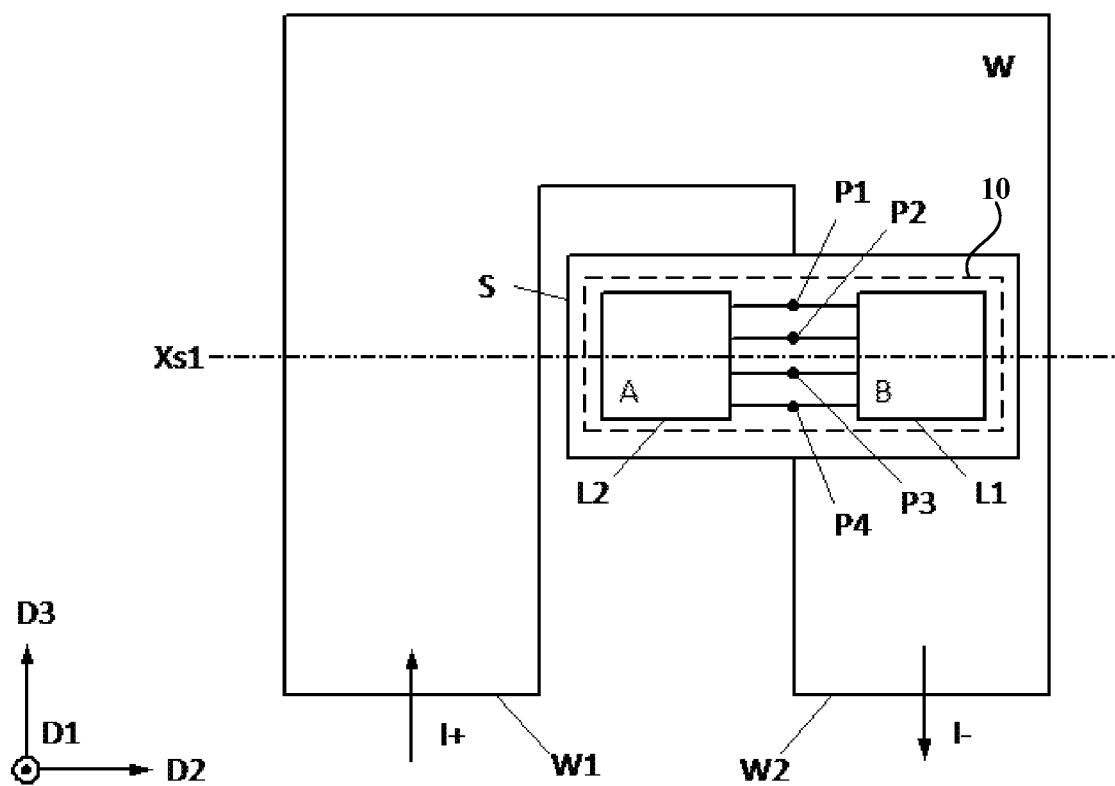
FIG. 17 is a structural view of another current detection apparatus according to an embodiment of the present disclosure.

An embodiment of the present disclosure provides a current detection apparatus. FIG. 16 is a structural diagram of a current detection apparatus according to an embodiment of the present disclosure. FIG. 17 is a structural view of another current detection apparatus according to an embodiment of the present disclosure. With reference to FIG. 5, FIG. 16 and FIG. 17, an embodiment of the present disclosure provides a current detection apparatus. A conductor W is arranged in a preset detection area corresponding to the current detection apparatus; and a first signal magnetic field is generated when a current passes through the conductor W. The current detection apparatus includes a substrate, at least one magnetic sensor 10 provided in any preceding embodiment and arranged on the substrate, and a processing unit. The magnetic sensor 10 is configured to generate sensing electrical signals according to the first signal magnetic field generated when the current flows through the conductor W; the magnetic sensor 10 has no signal output for a second magnetic field, and the second magnetic field includes a uniform magnetic field outside the conductor W. The processing unit is connected to the magnetic sensor 10 and is configured to determine, according to the sensing electrical signals, a value of the current flowing through the conductor W.

In an embodiment, the magnetic sensor 10 may be a magnetoresistive sensor such as an anisotropic magnetoresistive (AMR) sensor, a giant magnetoresistive (GMR) sensor, or a tunneling magnetoresistive (TMR) sensor. The magnetic sensor 10 may detect a magnetic field component in a direction parallel to the substrate or perpendicular to the substrate. The current detection apparatus 100 includes the substrate S whose orthographic projection on the conductor W may partially overlap the conductor W. The magnetic sensor 10 may be arranged on the side of the substrate S facing the conductor W or on the side of the substrate S facing away from the conductor W. The magnetic sensor 10 may be arranged on the surface of the substrate S or partially embedded in the substrate S. The number of magnetic sensors 10 may be one or more. In the case where a plurality of magnetic sensors 10 are arranged on the substrate S, the plurality of magnetic sensors 10 may be arranged on the same side or on different sides of the substrate S, which is not limited herein.

The magnetic sensor 10 includes at least two sensing portions 11 which are different in a direction of a magnetic field component of the first signal magnetic field. Exemplarily, with reference to FIG. 17 which exemplarily shows the case where the magnetic sensor 10 includes a first sensing portion A and a second sensing portion B which are different in the direction of the magnetic field component of the first signal magnetic field.

The substrate S is closer to and at a distance from the second terminal w2 of the conductor W. When a positive current I is introduced into the conductor W from the first terminal w1 and derived from the second terminal w2, a first signal magnetic field Bh is generated. The directions of the magnetic field components of the first signal magnetic field Bh are clockwise around the first terminal w1 and counter-clockwise around the second terminal w2. With such a magnetic field distribution, a magnetic field component in the $-D2$ direction is generated at the second sensing portion B. That is, the second sensing portion B of the magnetic sensor 10 detects a first signal magnetic field in the $-D2$ direction. The current I generates a magnetic field component in the $-D1$ direction at the first sensing portion A. That is, the first sensing portion A of the magnetic sensor 10 detects a first signal magnetic field in the $-D1$ direction. The magnetic sensor 10 generates sensing electrical signals according to the first signal magnetic field generated by the current I flowing through the conductor W.

The processing circuit 20 is connected to the magnetic sensor 10 and calculates, according to the sensing electrical signals, a value of the current flowing through the conductor W. The processing circuit 20 may perform multipole amplification, signal sampling, signal operation and the like, various calibrations such as a temperature calibration and a zero drift calibration, and processing such as ripple removal and the like on the received sensing electrical signals, so as to improve the detection accuracy of the current I flowing through the conductor W.

According to the current detection apparatus provided in the embodiment of the present disclosure, at least one magnetic sensor 10 is arranged on the substrate S; the magnetic sensor 10 includes at least two sensing portion 11 which are different in the direction of the magnetic field component of the first signal magnetic field. The sensing portion 11 includes the half-bridge configuration or the full-bridge configuration. The magnetic sensor 10 generates sensing electrical signals according to the first signal magnetic field generated when the current flows through the conductor W. The magnetic sensor 10 has no signal output for the second magnetic field, and the second magnetic field includes the uniform magnetic field outside the conductor W. The processing unit determines, according to the sensing electrical signals, the value of the current flowing through the conductor W. In this case, the magnetic sensor 10 outputs the sensing electrical signals merely for the first signal magnetic field and does not output a sensing electrical signal for the second magnetic field, thereby better eliminating the interference of the uniform magnetic field outside the conductor W and improving the detection accuracy of the current I flowing through the conductor W.

On the basis of the preceding embodiments and with continued reference to FIG. 5, the substrate has a first surface facing the conductor W and a second surface facing away from the conductor W. The substrate includes at least two sensing positions which are spaced apart on the first surface or the second surface. The sensing portions are arranged at the sensing positions. The magnetic sensor 10 senses the first signal magnetic field generated when the current passes through the conductor W. The magnetic sensor 10 generates the sensing electrical signals according to a difference between magnetic field strengths of components of the first signal magnetic field in preset directions at the at least two sensing positions.

In an embodiment, FIG. 5 exemplarily shows the case where the current detection apparatus includes one magnetic sensor 10 including a first sensing portion A disposed at a second sensing position L2 and a second sensing portion B disposed at the first sensing position L1. The second surface of the substrate S is closer to the second terminal w2 of the conductor W, and the substrate S has a preset distance range from the conductor W. When a positive current I+ is introduced into the conductor W from the first terminal w1 and derived from the second terminal w2, a first signal magnetic field Bh is generated. The direction of the first signal magnetic field Bh is clockwise around the first terminal w1 and counterclockwise around the terminal w2. With such distribution of the first signal magnetic field, a magnetic field component in the −D2 direction is generated at the first sensing position L1. That is, the second sensing portion B of the magnetic sensor 10 detects a first signal magnetic field in the −D2 direction. The current I generates a magnetic field component in the −D1 direction at the second sensing position L2. That is, the first sensing portion A of the magnetic sensor 10 detects a first signal magnetic field in the −D1 direction. The magnetic sensor 10 generates the sensing electrical signals according to the difference between magnetic field strengths of a component of the first signal magnetic field in a preset direction at the second sensing position L2 and a component of the first signal magnetic field in a preset direction at the first sensing position L1, for example, the difference between the magnetic field strength of the first signal magnetic field in the −D1 direction detected by the first sensing portion A and the magnetic field strength of the first signal magnetic field in the −D2 direction detected by the second sensing portion B of the magnetic sensor 10.

Figure 18:
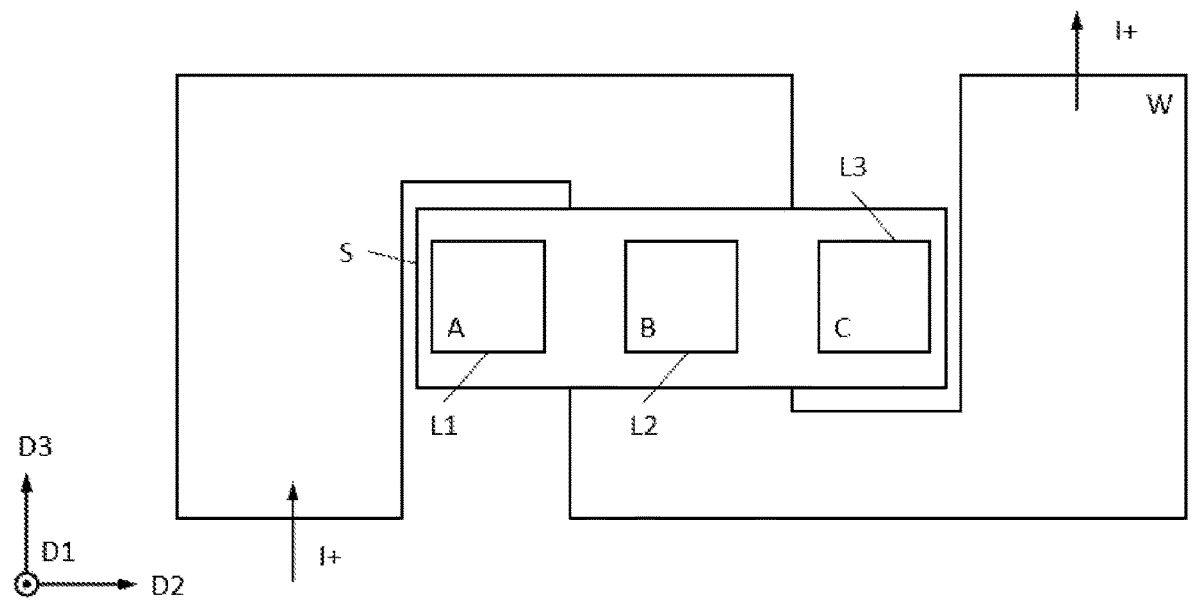
FIG. 18 is a structural view of a position relationship between another magnetic sensor and wires according to an embodiment of the present disclosure.

FIG. 18 is a structural view of a position relationship between another magnetic sensor 10 and wires according to an embodiment of the present disclosure. On the basis of the preceding embodiments and with reference to FIG. 2, FIG. 3, FIG. 13 and FIG. 18, the configuration of each sensing portion 11 of each magnetic sensor 10 is the same or different.

Figure 19:
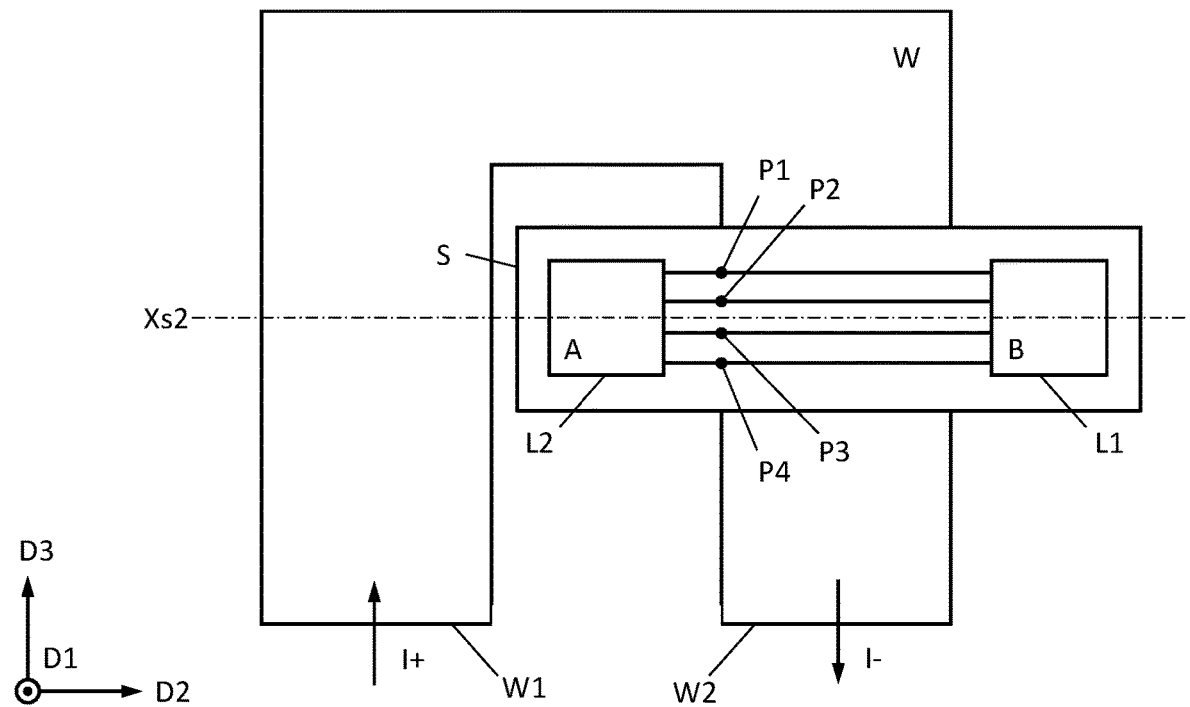
FIG. 19 is a structural view of another current detection apparatus according to an embodiment of the present disclosure.
Figure 20:
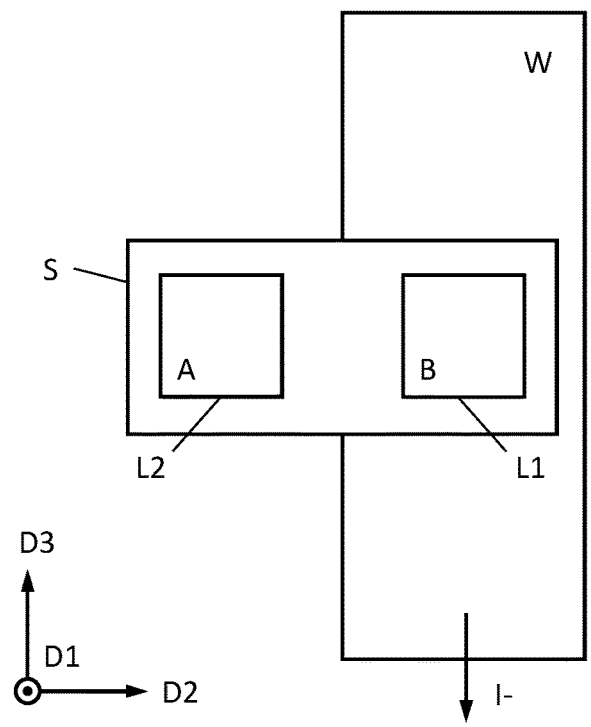
FIG. 20 is a structural view of another current detection apparatus according to an embodiment of the present disclosure.
Figure 21:
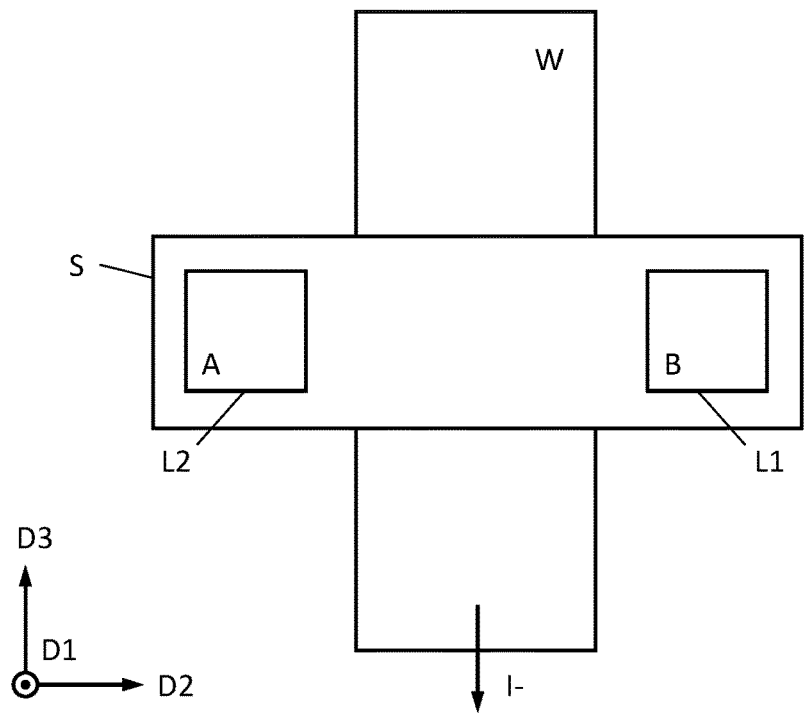
FIG. 21 is a structural view of another current detection apparatus according to an embodiment of the present disclosure.
Figure 22:
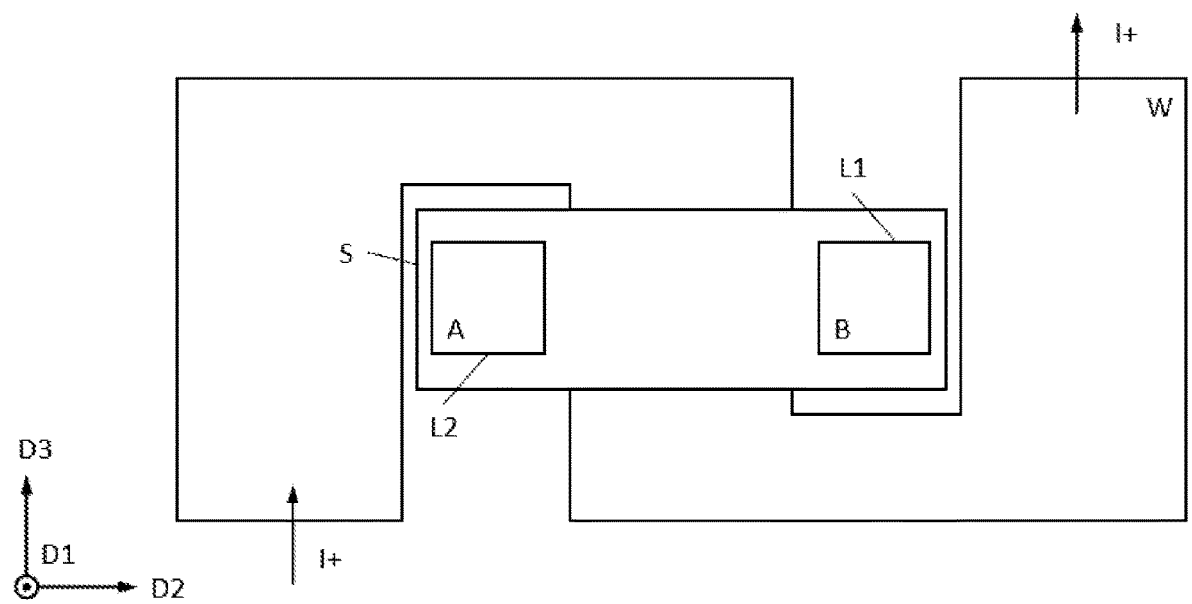
FIG. 22 is a structural view of another current detection apparatus according to an embodiment of the present disclosure.

FIG. 19 is a structural view of another current detection apparatus according to an embodiment of the present disclosure. FIG. 20 is a structural view of another current detection apparatus according to an embodiment of the present disclosure. FIG. 21 is a structural view of another current detection apparatus according to an embodiment of the present disclosure. FIG. 22 is a structural view of another current detection apparatus according to an embodiment of the present disclosure. FIG. 19 exemplarily shows a case where the conductor W is U-shaped, the orthographic projection of the first sensing portion A on the substrate S does not overlap the conductor W, and the orthographic projection of the second sensing portion B on the substrate S does not overlap the conductor W. FIG. 20 exemplarily shows a case where the conductor W is linear-shaped, the orthographic projection of the first sensing portion A on the substrate S does not overlap the conductor W, and the orthographic projection of the second sensing portion B on the substrate S overlaps the conductor W. FIG. 21 exemplarily shows a case where the conductor W is linear-shaped, the first sensing portion A and the second sensing portion B are connected across opposite sides of the conductor W, and the conductor W does not overlap the orthographic projection of the first sensing portion A on the substrate S or the orthographic projection of the second sensing portion B on the substrate S, which is not limited herein. FIG. 22 exemplarily shows a case where the conductor W is S-shaped, the first sensing portion A and the second sensing portion B are connected across opposite sides of the conductor W, and the conductor W does not overlap the orthographic projection of the first sensing portion A on the substrate S or the orthographic projection of the second sensing portion B on the substrate S. The first sensing portion A of the magnetic sensor 10 is arranged at the second sensing position L2 on the inner side of a turn of the conductor W, the second sensing portion B of the magnetic sensor 10 is arranged at the first sensing position L1 on the inner side of another turn of the conductor W, and the conductor W does not overlap the orthographic projection of the first sensing portion A on the conductor W or the orthographic projection of the second sensing portion B on the conductor W, which is not limited herein.

Figure 23:
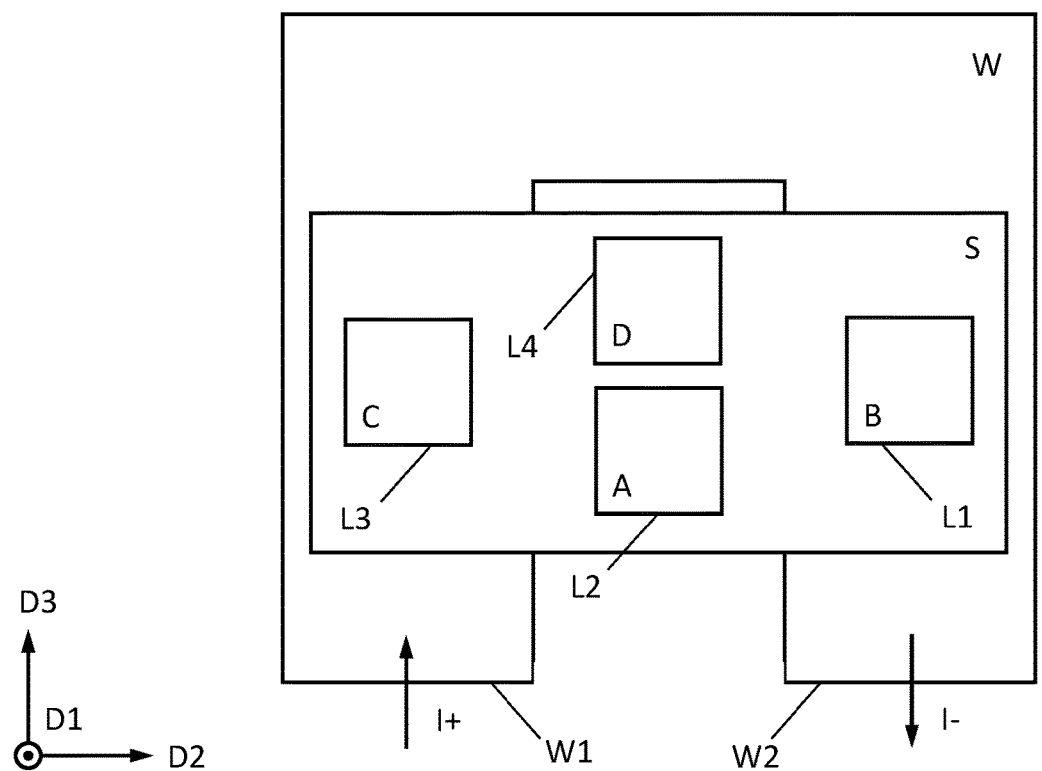
FIG. 23 is a structural view of another current detection apparatus according to an embodiment of the present disclosure.
Figure 24:
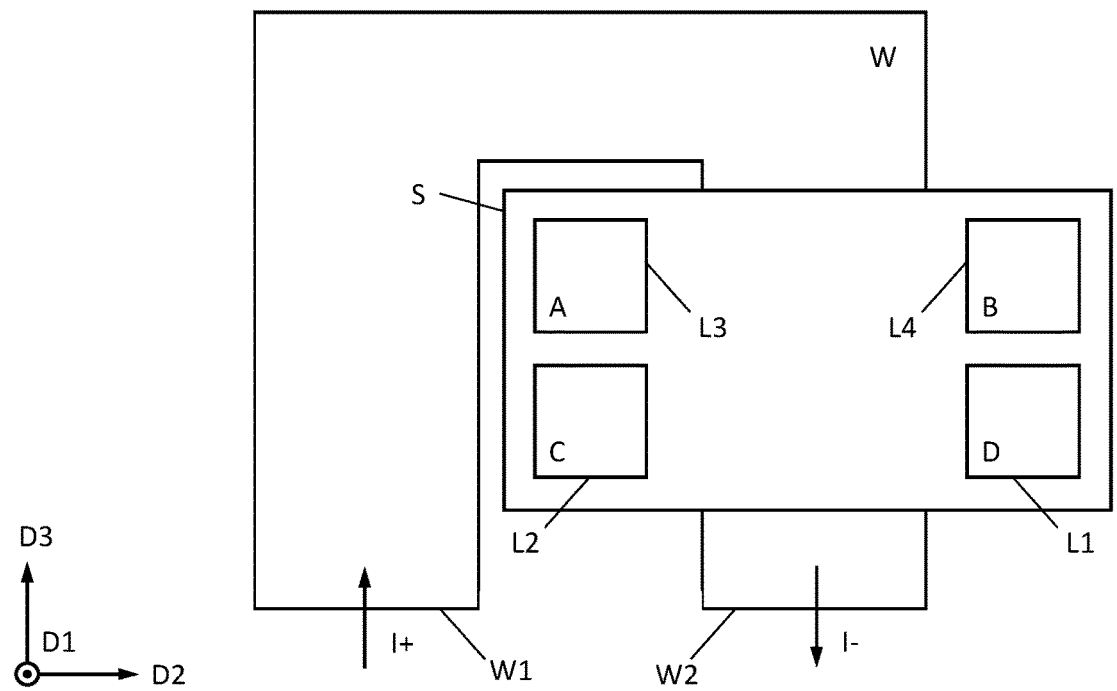
FIG. 24 is a structural view of another current detection apparatus according to an embodiment of the present disclosure.
Figure 25:
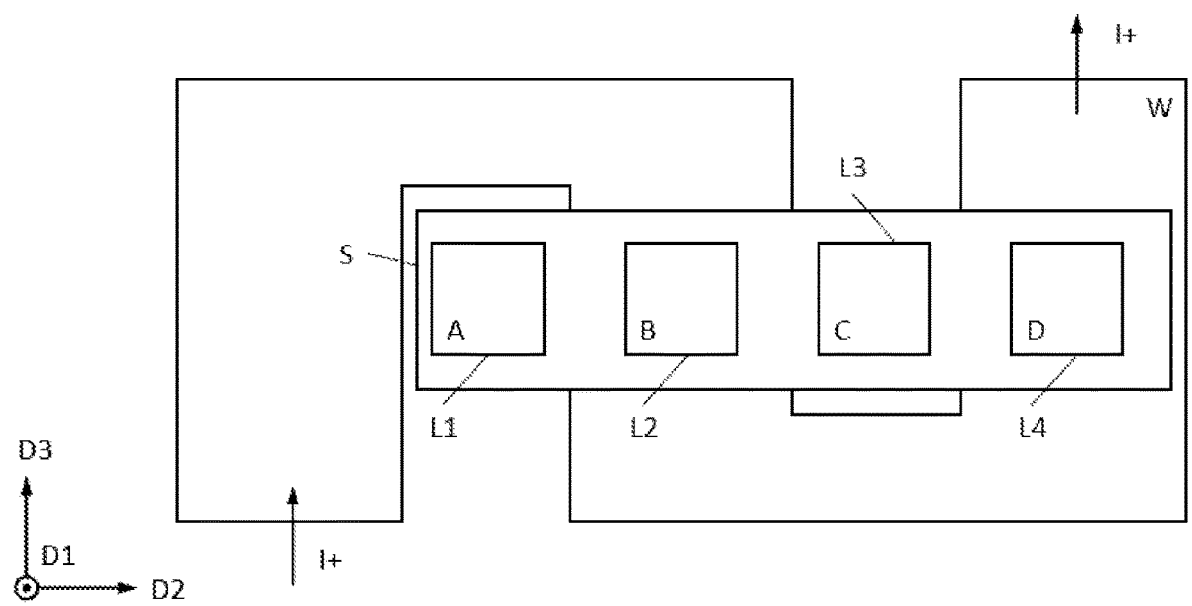
FIG. 25 is a structural view of another current detection apparatus according to an embodiment of the present disclosure.
Figure 26:
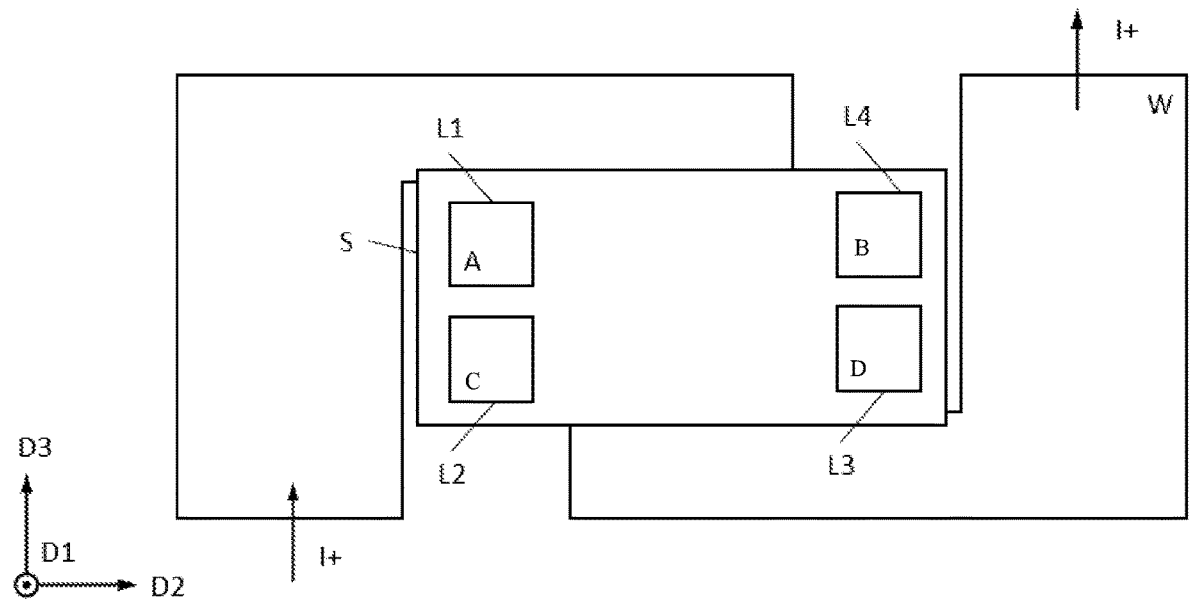
FIG. 26 is a structural view of another current detection apparatus according to an embodiment of the present disclosure.
Figure 27:
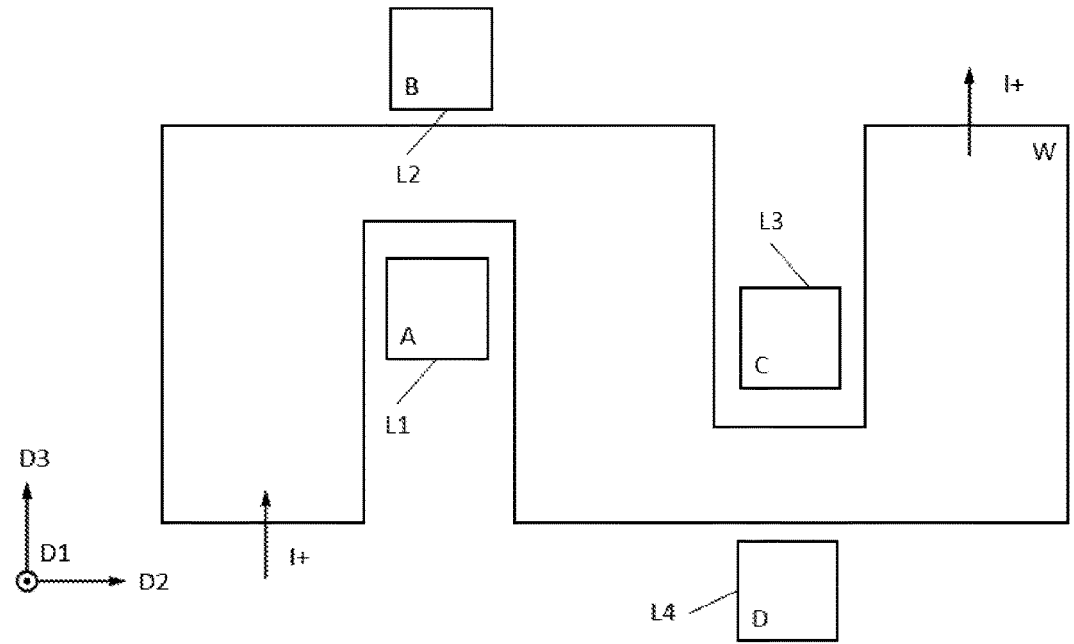
FIG. 27 is a structural view of another current detection apparatus according to an embodiment of the present disclosure.

FIG. 23 is a structural view of another current detection apparatus according to an embodiment of the present disclosure. FIG. 24 is a structural view of another current detection apparatus according to an embodiment of the present disclosure. FIG. 25 is a structural view of another current detection apparatus according to an embodiment of the present disclosure. FIG. 26 is a structural view of another current detection apparatus according to an embodiment of the present disclosure. FIG. 27 is a structural view of another current detection apparatus according to an embodiment of the present disclosure. FIG. 23 exemplarily shows a case where the conductor W is U-shaped and the current detection apparatus includes two magnetic sensors 10 each including two sensing portions 11. A first magnetic sensor includes a first sensing portion A and a second sensing portion B. A second magnetic sensor includes a third sensing portion C and a fourth sensing portion D. Along an extension direction of the first sensing portion A pointing to the second sensing portion B, the magnetic sensor 10 crosses an extension direction of the conductor W. FIG. 24 exemplarily shows a case where the conductor W is U-shaped, the orthographic projection of the first sensing portion A on the substrate S does not overlap the conductor W, and the orthographic projection of the second sensing portion B on the substrate S does not overlap the conductor W. FIG. 24 to FIG. 27 exemplarily show that along the extension direction of the first sensing portion A pointing to the second sensing portion B, the magnetic sensor 10 is perpendicular to the extension direction of the conductor W, which is not limited herein.

Figure 28:
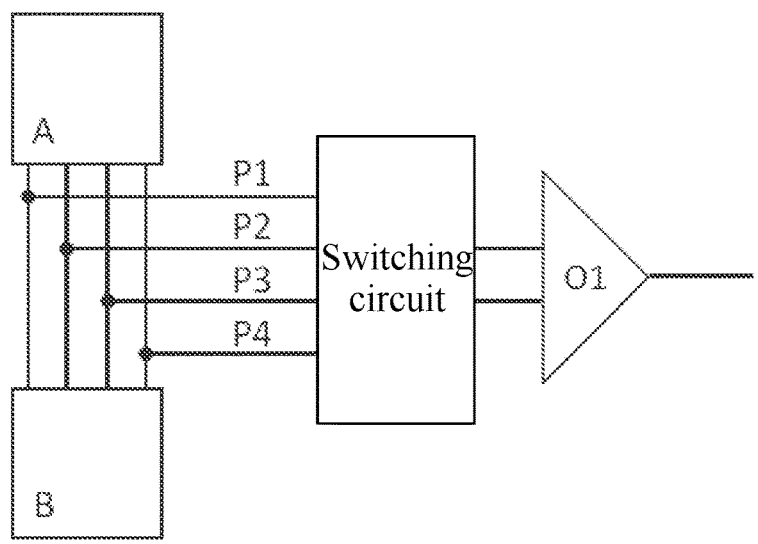
FIG. 28 is a structural view of another current detection apparatus according to an embodiment of the present disclosure.
Figure 29:
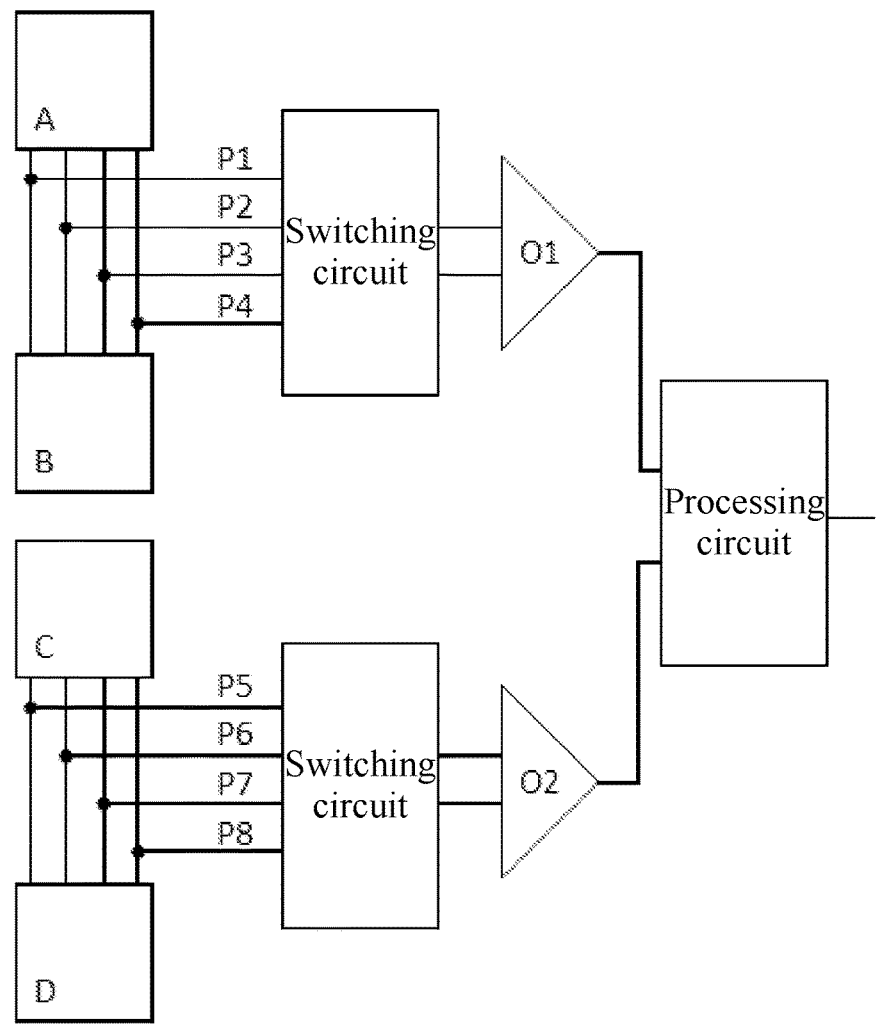
FIG. 29 is a structural view of another current detection apparatus according to an embodiment of the present disclosure.

FIG. 28 is a structural view of another current detection apparatus according to an embodiment of the present disclosure. FIG. 29 is a structural view of another current detection apparatus according to an embodiment of the present disclosure. On the basis of the preceding embodiments and with reference to FIG. 23 and FIG. 24, the current detection apparatus provided in the embodiment of the present disclosure further includes at least one switching circuit arranged on the substrate. The switching circuit is electrically connected to the output terminals of the magnetic sensor 10, is configured to switch a connection mode of the output terminals of the magnetic sensor 10 so as to adjust a working state of the magnetic sensor 10, and is configured to sequentially drive the magnetic sensor 10 to output the sensing electrical signals in the first signal magnetic field. Preferably, the at least one magnetic sensor 10 is arranged in one-to-one correspondence with the at least one switching circuit.

In an embodiment, the switching circuit may switch the connection mode of the output terminals of the magnetic sensor 10 so as to adjust the working state of the magnetic sensor 10 and may sequentially drive the magnetic sensor 10 to output the first sensing electrical signal and the second sensing electrical signal in the first signal magnetic field.

In an embodiment, with reference to FIG. 28, the first sensing portion A and the second sensing portion B of the magnetic sensor 10 are connected to each other through wires to form output terminals, that is, a first drive terminal P1, a first output terminal P2, a second drive terminal P3 and a second output terminal P4. The four output terminals are connected to a switching circuit. Through contact switching by the switching circuit, the first connection mode to the fourth connection mode of the magnetic sensor 10 can be sequentially formed, and the magnetic sensor 10 can be driven to sequentially generate a first output, a second output, a third output and a fourth output. The first connection mode is as follows: the first drive terminal P1 is connected to a power supply, the second drive terminal P3 is connected to the ground, and the first output terminal P2 and the second output terminal P4 are signal output terminals. The second connection mode is as follows: the second output terminal P4 is connected to the power supply, the first output terminal P2 is connected to the ground, and the second drive terminal P3 and the first drive terminal P1 are signal output terminals. The third connection mode is as follows: the second drive terminal P3 is connected to the power supply, the contact of the first drive terminal P1 is connected to the ground, and the second output terminal P4 and the first output terminal P2 are signal output terminals. The fourth connection mode is as follows: the first output terminal P2 is connected to the power supply, the second output terminal P4 is connected to the ground, and the first drive terminal P1 and the second drive terminal P3 are signal output terminals.

In an embodiment, with reference to FIG. 29, FIG. 29 exemplarily shows a case where the current detection apparatus includes two magnetic sensors 10, that is, a first magnetic sensor and a second magnetic sensor. The first sensing portion A and the second sensing portion B of the first magnetic sensor are connected to each other through wires to form four output terminals, that is, the first drive terminal P1, the first output terminal P2, the second drive terminal P3 and the second output terminal P4 which are four contacts. The first drive terminal P1, the first output terminal P2, the second drive terminal P3 and the second output terminal P4 are connected to a switching circuit. Through output terminal switching by the switching circuit, the first connection mode to the fourth connection mode of the magnetic sensor 10 can be sequentially formed, and the magnetic sensor 10 can be driven to sequentially generate a first output to a fourth output. The third sensing portion C and the fourth sensing portion D of the second magnetic sensor are connected to each other through wires to form four output terminals. The four output terminals are a third drive terminal P5, a third output terminal P6, a fourth drive terminal P7 and a fourth output terminal P8. The third drive terminal P5, the third output terminal P6, the fourth drive terminal P7 and the fourth output terminal P8 are connected to another switching circuit. Through output terminal switching by the switching circuit, the fifth connection mode to the eighth connection mode of the magnetic sensor 10 can be sequentially formed, and the magnetic sensor 10 can be driven to sequentially generate a fifth output to an eighth output.

On the basis of the preceding embodiments and with reference to FIG. 28 and FIG. 29, the current detection apparatus provided in the embodiment of the present disclosure may further include an amplifying unit. The amplifying unit is connected between the switching circuit and the processing circuit 20 and is configured to receive sensing electrical signals, perform differential amplification on the sensing electrical signals, and output the amplified sensing electrical signals to the processing circuit 20.

In an embodiment, with reference to FIG. 29, the amplification unit may include a first differential operational amplifier 01 and a second differential operational amplifier 02. The current detection apparatus includes the first magnetic sensor and the second magnetic sensor. An output terminal of the first magnetic sensor is connected to the first differential operational amplifier 01. The sensing electrical signals output from the first magnetic sensor are amplified by the first differential operational amplifier 01 and input into the processing circuit 20.

An output terminal of the second magnetic sensor is connected to the second differential operational amplifier 02. The sensing electrical signals output from the second magnetic sensor are amplified by the second differential operational amplifier 02 and input into the processing circuit 20. The processing circuit 20 may perform functions such as multipole amplification, signal sampling, signal operation such as multiple sampling addition or averaging, and various calibration such as temperature calibration, zero drift calibration and ripple removal and output current detection values. With such arrangement, the current detection accuracy of the current detection apparatus is further improved, and the anti-electromagnetic interference ability of the current detection apparatus is improved.

Figure 30:
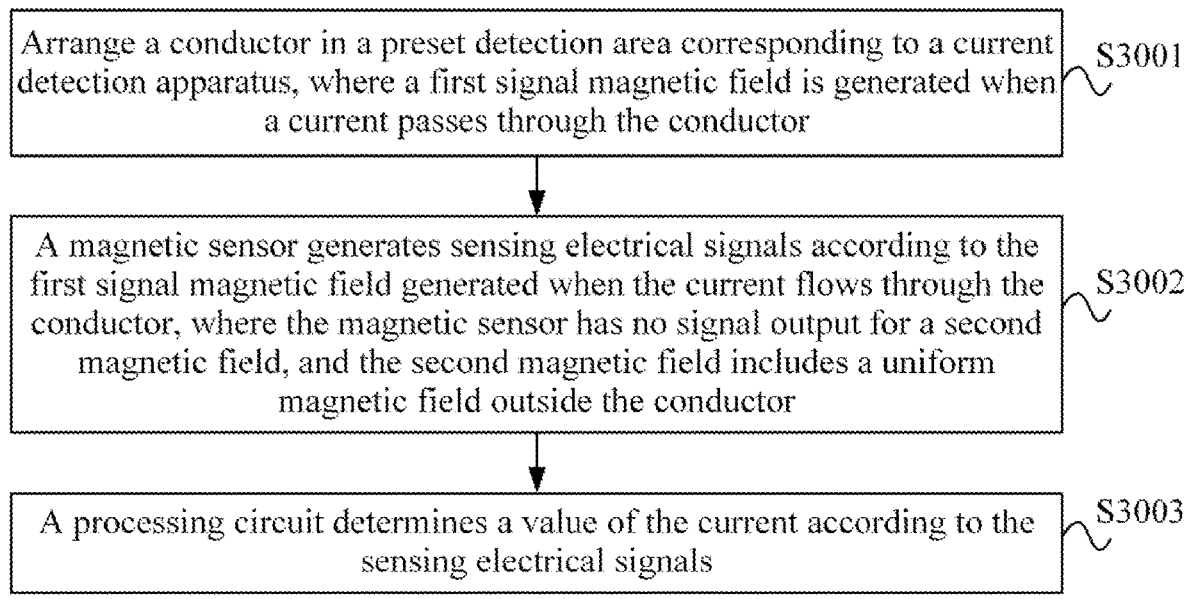
FIG. 30 is a flowchart of a current detection method according to an embodiment of the present disclosure.

FIG. 30 is a flowchart of a current detection method according to an embodiment of the present disclosure. On the basis of the preceding embodiments and with reference to FIG. 5, FIG. 16, FIG. 17 and FIG. 30, the current detection method provided in the embodiment of the present disclosure is applied to the current detection apparatus provided in any preceding embodiment. The current detection apparatus provided in the embodiment of the present disclosure includes a substrate S, at least one magnetic sensor 10 provided in any preceding embodiment and arranged on the substrate, and a processing circuit 20. The processing circuit 20 is connected to the magnetic sensor 10. The magnetic sensor 10 includes at least two sensing portions 11 which are different in a direction of a magnetic field component of a first signal magnetic field Bh.

The current detection method provided in the embodiment of the present disclosure includes the steps described below.

In S3001, a conductor is arranged in a preset detection area corresponding to the current detection apparatus, where a first signal magnetic field is generated when a current passes through the conductor.

In S3002, the magnetic sensor generates sensing electrical signals according to the first signal magnetic field generated when the current flows through the conductor, where the magnetic sensor has no signal output for a second magnetic field, and the second magnetic field includes a uniform magnetic field outside the conductor.

In S3003, the processing circuit determines, according to the sensing electrical signals, a value of the current.

According to the current detection method provided in the embodiment of the present disclosure, the conductor is arranged in the preset detection area corresponding to the current detection apparatus, the magnetic sensor generates the sensing electrical signals according to the first signal magnetic field generated when the current flows through the conductor, and the processing circuit determines, according to the sensing electrical signals, the value of the current flowing through the conductor. With such arrangement, the magnetic sensor outputs the sensing electrical signals merely for the first signal magnetic field and does not output a sensing electrical signal for the second magnetic field, thereby better eliminating the interference of the uniform magnetic field outside the conductor and improving the detection accuracy of the current flowing through the conductor. Additionally, the current detection apparatus adopted for the current detection method provided in the embodiment of the present disclosure has simple structure, low cost and good practicability.

It is to be understood that various forms of the preceding flows may be used with steps reordered, added, or deleted. For example, the steps described in the present disclosure may be performed in parallel, in sequence, or in a different order as long as the desired result of the technical solutions provided in the present disclosure can be achieved. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure fall within the scope of the present disclosure.

What is claimed is:

1. A magnetic sensor, comprising:
at least two sensing portions which are different in a direction of a magnetic field component of a first signal magnetic field generated by a current flowing through a conductor and are correspondingly electrically connected; wherein,
a sensing portion of the at least two sensing portions comprises a half-bridge configuration or a full-bridge configuration and is configured to cause a resistance change to the first signal magnetic field through the half-bridge configuration or the full-bridge configuration to generate a sensing electrical signal;
the magnetic sensor further comprising:
a plurality of first connection lines and a plurality of output terminals;
wherein the at least two sensing portions are connected in parallel through the plurality of first connection lines, and each of the plurality of first connection lines is connected to one of the plurality of output terminals;
wherein the plurality of output terminals comprises a first output terminal, a second output terminal, a first drive terminal, and a second drive terminal; wherein,
the first output terminal is configured to output a first sensing electrical signal;
the second output terminal is configured to output a second sensing electrical signal;
the first drive terminal is configured to be connected to a power supply and the second drive terminal is configured to be grounded; or the first drive terminal is configured to be grounded and the second drive terminal is configured to be connected to a power supply; and
under the first signal magnetic field, the first sensing electrical signal and the second sensing electrical signal have different amplitude variations and different phase variations.

2. The magnetic sensor of claim 1, wherein
the first signal magnetic field has different directions in the at least two sensing portions; and
the first signal magnetic field has different strengths in the at least two sensing portions.

3. The magnetic sensor of claim 1, wherein
an orthographic projection of at least one of the at least two sensing portions on the conductor at least partially overlaps the conductor; or
an orthographic projection of none of the at least two sensing portions on the conductor overlaps the conductor.

4. The magnetic sensor of claim 1, wherein
the half-bridge configuration comprises a first electrode, a second electrode, a first magnetoresistive unit, a second magnetoresistive unit, and a connection terminal; a first terminal of the first magnetoresistive unit is connected to the first electrode, a second terminal of the first magnetoresistive unit is connected to a first terminal of the second magnetoresistive unit and the connection terminal, and a second terminal of the second magnetoresistive unit is connected to the second electrode; and
the full-bridge configuration comprises a first electrode, a second electrode, a third electrode, a fourth electrode, a third magnetoresistive unit, a fourth magnetoresistive unit, a fifth magnetoresistive unit, and a sixth magnetoresistive unit; and a first terminal of the third magnetoresistive unit is connected to the first electrode, a second terminal of the third magnetoresistive unit is connected to a first terminal of the fourth magnetoresistive unit and the second electrode, a second terminal of the fourth magnetoresistive unit is connected to a first terminal of the fifth magnetoresistive unit and the third electrode, a second terminal of the fifth magnetoresistive unit is connected to a first terminal of the sixth magnetoresistive unit and the fourth electrode, and a second terminal of the sixth magnetoresistive unit is connected to the first electrode.

5. The magnetic sensor of claim 4, wherein the at least two sensing portions comprise a first sensing portion and a second sensing portion;
the first sensing portion and the second sensing portion each have the half-bridge configuration; and
a first electrode of the half-bridge configuration of the first sensing portion and a first electrode of the half-bridge configuration of the second sensing portion are connected as the first drive terminal; a second electrode of the half-bridge configuration of the first sensing portion and a second electrode of the half-bridge configuration of the second sensing portion are connected as the second drive terminal; a connection terminal of the half-bridge configuration of the first sensing portion is configured as the first output terminal; and a connection terminal of the half-bridge configuration of the second sensing portion is configured as the second output terminal.

6. The magnetic sensor of claim 4, wherein the at least two sensing portions comprise a first sensing portion and a second sensing portion;
the first sensing portion and the second sensing portion each have the full-bridge configuration; and
a first electrode of the full-bridge configuration of the first sensing portion and a first electrode of the full-bridge configuration of the second sensing portion are connected as the first drive terminal; a second electrode of the full-bridge configuration of the first sensing portion and a fourth electrode of the full-bridge configuration of the second sensing portion are connected as the second output terminal; a third electrode of the full-bridge configuration of the first sensing portion and a third electrode of the full-bridge configuration of the second sensing portion are connected as the second drive terminal; and a fourth electrode of the full-bridge configuration of the first sensing portion and a second electrode of the full-bridge configuration of the second sensing portion are connected as the first output terminal.

7. The magnetic sensor of claim 6, wherein the at least two sensing portions comprise a first sensing portion, a second sensing portion, and a third sensing portion;
the first sensing portion has a full-bridge configuration, and the second sensing portion and the third sensing portion each have a half-bridge configuration;
a first electrode of the full-bridge configuration of the first sensing portion, a first electrode of the half-bridge configuration of the second sensing portion and a first electrode of the half-bridge configuration of the third sensing portion are connected as the first drive terminal;
a second electrode of the full-bridge configuration of the first sensing portion and a connection terminal of the half-bridge configuration of the third sensing portion are connected as the first output terminal;
a third electrode of the full-bridge configuration of the first sensing portion, a second electrode of the half-bridge configuration of the second sensing portion and a second electrode of the half-bridge configuration of the third sensing portion are connected as the second drive terminal; and
a fourth electrode of the full-bridge configuration of the first sensing portion and a connection terminal of the half-bridge configuration of the second sensing portion are connected as the second output terminal.

8. The magnetic sensor of claim 6, wherein
a sensitive direction of the magnetic sensor is parallel or perpendicular to a plane where the conductor is disposed.

9. A current detection apparatus, wherein a conductor is arranged in a preset detection area corresponding to the current detection apparatus; and a first signal magnetic field is generated when a current passes through the conductor; and
wherein the current detection apparatus comprises a substrate, at least one magnetic sensor which is arranged on the substrate, and a processing unit;
wherein a magnetic sensor of the at least one magnetic sensor comprises at least two sensing portions which are different in a direction of a magnetic field component of a first signal magnetic field generated by a current flowing through a conductor and are correspondingly electrically connected; and a sensing portion of the at least two sensing portions comprises a half-bridge configuration or a full-bridge configuration and is configured to cause a resistance change to the first signal magnetic field through the half-bridge configuration or the full-bridge configuration to generate a sensing electrical signal; and
the magnetic sensor is configured to generate sensing electrical signals according to the first signal magnetic field generated when the current flows through the conductor; and
the processing unit is connected to the magnetic sensor and is configured to determine a value of the current according to the sensing electrical signals;
wherein the magnetic sensor further comprises a plurality of first connection lines and a plurality of output terminals; the at least two sensing portions are connected in parallel through the plurality of first connection lines, and each of the plurality of first connection lines is connected to one of the plurality of output terminals;
wherein the plurality of output terminals comprises a first output terminal, a second output terminal, a first drive terminal, and a second drive terminal; the first output terminal is configured to output a first sensing electrical signal; the second output terminal is configured to output a second sensing electrical signal; the first drive terminal is configured to be connected to a power supply and the second drive terminal is configured to be grounded; or the first drive terminal is configured to be grounded and the second drive terminal is configured to be connected to a power supply; and under the first signal magnetic field, the first sensing electrical signal and the second sensing electrical signal have different amplitude variations and different phase variations.

10. The current detection apparatus of claim 9, wherein
the substrate has a first surface facing the conductor and a second surface facing away from the conductor;
the substrate comprises at least two sensing positions which are spaced apart on the first surface or the second surface;
the at least two sensing portions are arranged at the at least two sensing positions; the magnetic sensor is configured to sense the first signal magnetic field generated when the current passes through the conductor; and the magnetic sensor is configured to generate the sensing electrical signals according to a difference between magnetic field strengths of components of the first signal magnetic field in preset directions at the at least two sensing positions.

11. The current detection apparatus of claim 9, wherein the at least two sensing portions of each of the at least one magnetic sensor have a same configuration or different configurations.

12. The current detection apparatus of claim 9, further comprising:

at least one switching circuit arranged on the substrate, wherein a switching circuit of the at least one switching circuit is electrically connected to output terminals of the at least one magnetic sensor, is configured to switch a connection mode of the output terminals of the at least one magnetic sensor so as to adjust a working state of the magnetic sensor, and is configured to sequentially drive the at least one magnetic sensor to output sensing electrical signals under the first signal magnetic field.

13. The current detection apparatus of claim 12, wherein the at least one magnetic sensor is arranged in one-to-one correspondence with the at least one switching circuit.

14. The current detection apparatus of claim 12, further comprising:

an amplifying unit connected between the switching circuit and the processing unit and configured to receive the sensing electrical signals, perform differential amplification on the sensing electrical signals, and output the amplified sensing electrical signals to the processing unit.

15. The current detection apparatus of claim 9, wherein the first signal magnetic field has different directions in the at least two sensing portions; and the first signal magnetic field has different strengths in the at least two sensing portions.

16. The current detection apparatus of claim 9, wherein an orthographic projection of at least one of the at least two sensing portions on the conductor at least partially overlaps the conductor; or an orthographic projection of none of the at least two sensing portions on the conductor overlaps the conductor.

17. The current detection apparatus of claim 9, wherein the half-bridge configuration comprises a first electrode, a second electrode, a first magnetoresistive unit, a second magnetoresistive unit, and a connection terminal; a first terminal of the first magnetoresistive unit is connected to the first electrode, a second terminal of the first magnetoresistive unit is connected to a first terminal of the second magnetoresistive unit and the connection terminal, and a second terminal of the second magnetoresistive unit is connected to the second electrode; and the full-bridge configuration comprises a first electrode, a second electrode, a third electrode, a fourth electrode, a third magnetoresistive unit, a fourth magnetoresistive unit, a fifth magnetoresistive unit, and a sixth magnetoresistive unit; and a first terminal of the third magnetoresistive unit is connected to the first electrode, a second terminal of the third magnetoresistive unit is connected to a first terminal of the fourth magnetoresistive unit and the second electrode, a second terminal of the fourth magnetoresistive unit is connected toto the a first terminal of the fifth magnetoresistive unit and the third electrode, a second terminal of the fifth magnetoresistive unit is connected to a first terminal of the sixth magnetoresistive unit and the fourth electrode, and a second terminal of the sixth magnetoresistive unit is connected to the first electrode.

18. The current detection apparatus of claim 17, wherein the at least two sensing portions comprise a first sensing portion and a second sensing portion;

the first sensing portion and the second sensing portion each have the half-bridge configuration; and a first electrode of the half-bridge configuration of the first sensing portion and a first electrode of the half-bridge configuration of the second sensing portion are connected as the first drive terminal; a second electrode of the half-bridge configuration of the first sensing portion and a second electrode of the half-bridge configuration of the second sensing portion are connected as the second drive terminal; a connection terminal of the half-bridge configuration of the first sensing portion is configured as the first output terminal; and a connection terminal of the half-bridge configuration of the second sensing portion is configured as the second output terminal.

19. The current detection apparatus of claim 17, wherein the at least two sensing portions comprise a first sensing portion and a second sensing portion;

the first sensing portion and the second sensing portion each have the full-bridge configuration; and a first electrode of the full-bridge configuration of the first sensing portion and a first electrode of the full-bridge configuration of the second sensing portion are connected as the first drive terminal; a second electrode of the full-bridge configuration of the first sensing portion and a fourth electrode of the full-bridge configuration of the second sensing portion are connected as the second output terminal; a third electrode of the full-bridge configuration of the first sensing portion and a third electrode of the full-bridge configuration of the second sensing portion are connected as the second drive terminal; and a fourth electrode of the full-bridge configuration of the first sensing portion and a second electrode of the full-bridge configuration of the second sensing portion are connected as the first output terminal.

20. A current detection method, the method being applied to a current detection apparatus which comprises: a substrate and at least one magnetic sensor arranged on the substrate, wherein a magnetic sensor of the at least one magnetic sensor comprises at least two sensing portions which are different in a direction of a magnetic field component of a first signal magnetic field generated by a current flowing through a conductor and are correspondingly electrically connected; and a sensing portion of the at least two sensing portions comprises a half-bridge configuration or a full-bridge configuration and is configured to cause a resistance change to the first signal magnetic field through the half-bridge configuration or the full-bridge configuration to generate a sensing electrical signal, and wherein a first signal magnetic field is generated when a current passes through a conductor in a preset detection area corresponding to the current detection apparatus;

wherein the magnetic sensor further comprises a plurality of first connection lines and a plurality of output terminals; the at least two sensing portions are connected in parallel through the plurality of first connection lines, and each of the plurality of first connection lines is connected to one of the plurality of output terminals;

wherein the plurality of output terminals comprises a first output terminal, a second output terminal, a first drive terminal, and a second drive terminal; the first output terminal is configured to output a first sensing electrical signal; the second output terminal is configured to output a second sensing electrical signal; the first drive terminal is configured to be connected to a power supply and the second drive terminal is configured to be grounded; or the first drive terminal is configured to be grounded and the second drive terminal is configured to be connected to a power supply; and under the first signal magnetic field, the first sensing electrical signal and the second sensing electrical signal have different amplitude variations and different phase variations;

wherein the current detection method comprises:
  generating, by a magnetic sensor of the at least one magnetic sensor, sensing electrical signals according to the first signal magnetic field; and
  determining, by a processing unit according to the sensing electrical signals, a value of the current.

* * * * *